US011162780B2

(12) United States Patent
Saito

(10) Patent No.: US 11,162,780 B2
(45) Date of Patent: Nov. 2, 2021

(54) SHAPE MEASURING DEVICE FOR HOSE CONNECTOR FITTING, SHAPE MEASURING METHOD FOR HOSE CONNECTOR FITTING AND SHAPE MEASURING PROGRAM FOR HOSE CONNECTOR FITTING

(71) Applicant: The Yokohama Rubber Co., LTD., Tokyo (JP)

(72) Inventor: Takayuki Saito, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/646,551

(22) PCT Filed: Aug. 28, 2018

(86) PCT No.: PCT/JP2018/031673
§ 371 (c)(1),
(2) Date: Mar. 11, 2020

(87) PCT Pub. No.: WO2019/049717
PCT Pub. Date: Mar. 14, 2019

(65) Prior Publication Data
US 2020/0271440 A1 Aug. 27, 2020

(30) Foreign Application Priority Data
Sep. 11, 2017 (JP) .............................. JP2017-174165

(51) Int. Cl.
*G01B 11/08* (2006.01)
*F16L 13/14* (2006.01)
(Continued)

(52) U.S. Cl.
CPC ............ *G01B 11/08* (2013.01); *F16L 13/141* (2013.01); *G01B 11/245* (2013.01);
(Continued)

(58) Field of Classification Search
CPC .... F16L 13/141–13/143; F16L 2201/10; F16L 33/2076; G01B 11/2408;
(Continued)

(56) References Cited

U.S. PATENT DOCUMENTS

2007/0218749 A1 9/2007 Viviroli
2008/0066332 A1* 3/2008 Metcalf ................. G01B 11/08
33/555.1
(Continued)

FOREIGN PATENT DOCUMENTS

JP 2007-248463 9/2007
JP 2009-192258 8/2009
(Continued)

OTHER PUBLICATIONS

International Search Report for International Application No. PCT/JP2018/031673 dated Oct. 23, 2018, 4 pages, Japan.

*Primary Examiner* — Michael P LaPage
(74) *Attorney, Agent, or Firm* — Thorpe North & Western

(57) ABSTRACT

In a hose connector fitting, an outer circumferential surface of a socket is crimped toward a radially inner side thereof within a crimping range along an axis direction of the socket in the state where a hose is inserted into an annular space between an outer circumferential portion of a nipple and an inner circumferential portion of the socket. A shape measuring device includes: a sensor and a rotational moving unit that detect distance data from a reference position to the surface of the socket over a zone including at least the entire crimping range; a shape data generating unit that generates shape data representative the three-dimensional shape of the socket surface based on the detected distance data; and a measurement data calculating unit that calculates measurement data about the crimping state of the socket based on the shape data.

19 Claims, 15 Drawing Sheets

(51) Int. Cl.
    *G01B 11/24* (2006.01)
    *G01B 11/245* (2006.01)
(52) U.S. Cl.
    CPC ....... *G01B 11/2408* (2013.01); *F16L 2201/10* (2013.01); *G01B 2210/54* (2013.01)
(58) Field of Classification Search
    CPC .. G01B 11/08; G01B 2210/54; G01B 11/245; G01B 11/25
    See application file for complete search history.

(56) References Cited

U.S. PATENT DOCUMENTS

| | | | |
|---|---|---|---|
| 2012/0263344 A1* | 10/2012 | Viviroli | G01B 5/061 382/100 |
| 2013/0253686 A1 | 9/2013 | Flament et al. | |
| 2017/0102341 A1 | 4/2017 | Nyyssola | |
| 2017/0170637 A1* | 6/2017 | Kominami | G01B 11/08 |

FOREIGN PATENT DOCUMENTS

| | | | | |
|---|---|---|---|---|
| JP | 2010-048307 | | 3/2010 | |
| JP | 2013-238569 | | 11/2013 | |
| JP | 2014-081024 | | 5/2014 | |
| JP | 2015-202509 | * | 11/2015 | ............. B21D 39/04 |
| JP | 2017-519229 | | 7/2017 | |
| WO | WO 2012/074527 | | 6/2012 | |
| WO | WO 2013/172300 | | 11/2013 | |
| WO | WO 2015/189466 | | 12/2015 | |

* cited by examiner

FIG. 13A
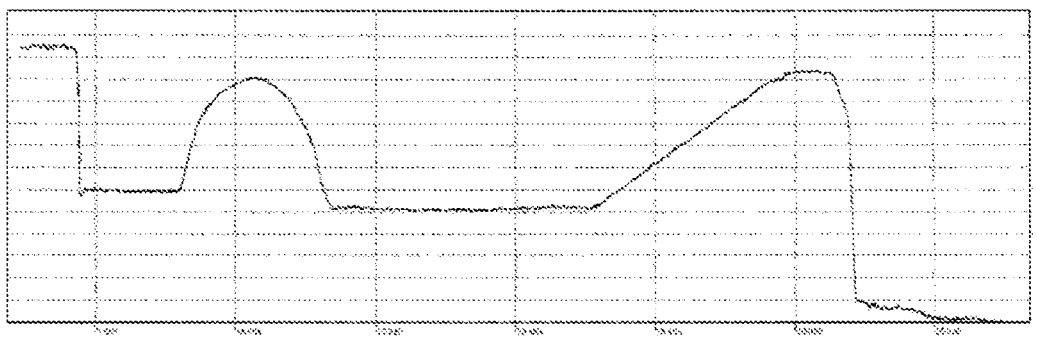
FIG. 13B
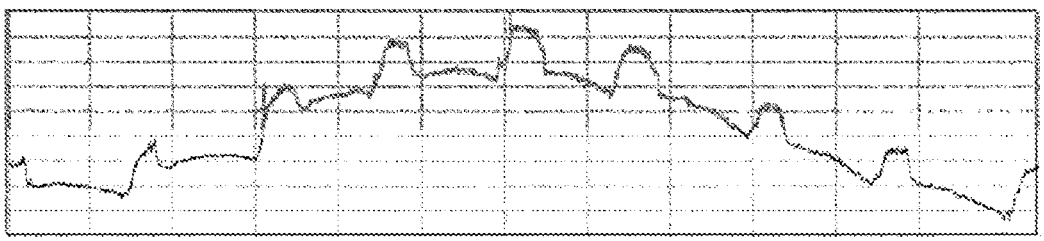
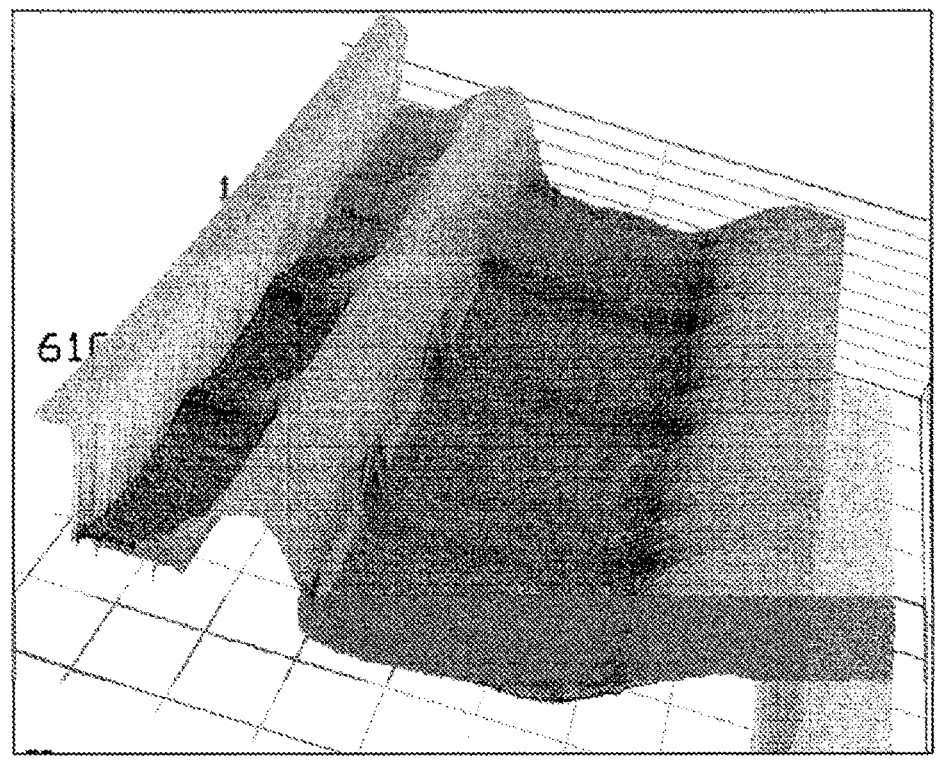
FIG. 14

FIG. 17A $$i = 0 \, to \, xSize \div 2 \quad \cdots(1)$$

$$rad = (PI \div ySize) \times j \quad \cdots(2)$$

$$coordX = R \times \cos(rad) \quad \cdots(3)$$
$$coordY = R \times \sin(rad) \quad \cdots(4)$$
$$coordZ = i \times resolution \quad \cdots(5)$$

FIG. 17B $$\begin{pmatrix} -2x_c \\ -2y_c \\ x_c^2 + y_c^2 - r^2 \end{pmatrix} = \begin{pmatrix} \sum x_i^2 & \sum x_i y_i & \sum x_i \\ \sum x_i y_i & \sum y_i^2 & \sum y_i \\ \sum x_i & \sum y_i & \sum 1 \end{pmatrix}^{-1} \begin{pmatrix} -\sum (x_i^3 + x_i y_i^2) \\ -\sum (x_i^2 y_i + y_i^3) \\ -\sum (x_i^2 + y_i^2) \end{pmatrix}$$

FIG. 17C $$\text{GRADIENT } \alpha = A \tan \left\{ \left( n \sum z_i y_i - \sum z_i \sum y_i \right) \div \left( n \sum z_i^2 - \left( \sum z_i \right)^2 \right) \right\}$$

$$\text{INTERCEPT } \beta = \left( \sum z_i^2 \sum y_i - \sum z_i y_i \sum z_i \right) \div \left( n \sum z_i^2 - \left( \sum z_i \right)^2 \right)$$

FIG. 17D $$\begin{pmatrix} y' \\ z' \end{pmatrix} = \begin{pmatrix} \cos \theta & -\sin \theta \\ \sin \theta & \cos \theta \end{pmatrix} \begin{pmatrix} y \\ z \end{pmatrix}$$

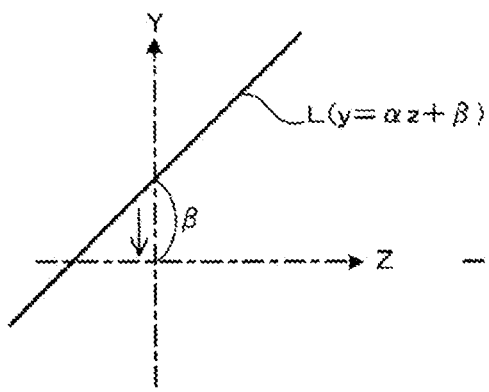
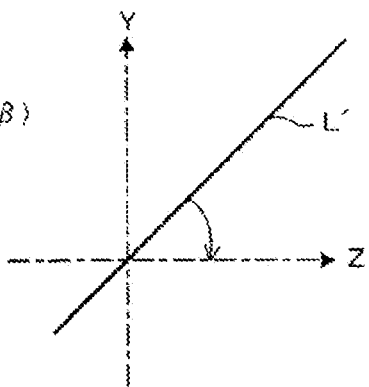
FIG. 18A          FIG. 18B
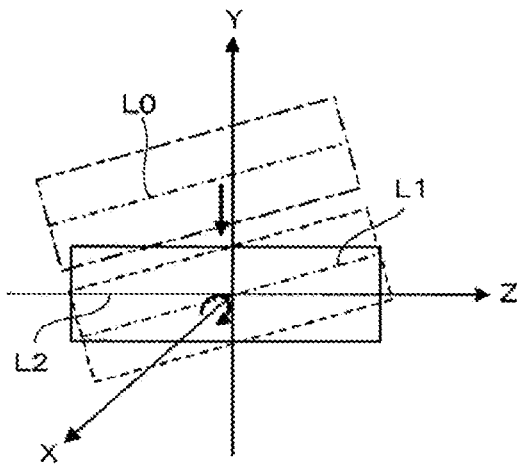
FIG. 19
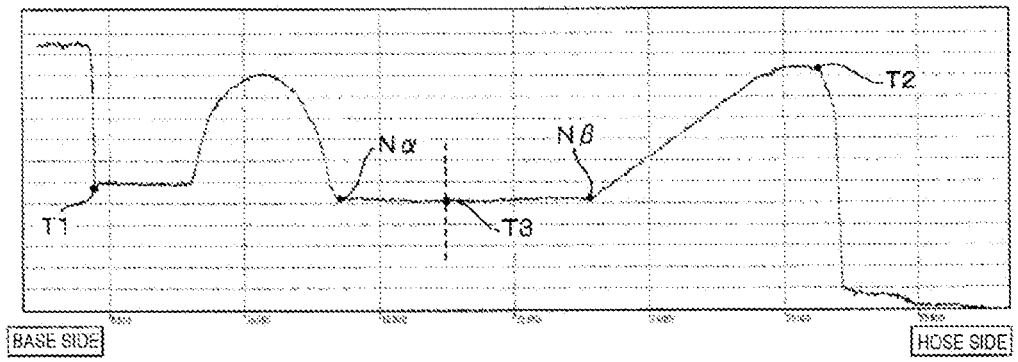
FIG. 20

SHAPE MEASURING DEVICE FOR HOSE CONNECTOR FITTING, SHAPE MEASURING METHOD FOR HOSE CONNECTOR FITTING AND SHAPE MEASURING PROGRAM FOR HOSE CONNECTOR FITTING

TECHNICAL FIELD

The present technology relates to a shape measuring device for a hose connector fitting, a shape measuring method for a hose connector fitting and a shape measuring program for a hose connector fitting.

BACKGROUND ART

A hose connector fitting coupled to an end of a hose for connecting a hose to equipment has been provided.

The hose connector fitting includes a nipple and a socket that are coupled to each other, and an annular space is formed between an outer circumferential portion of the nipple and an inner circumferential portion of the socket.

The hose connector fitting is attached to the hose end by crimping an outer circumferential surface of the socket toward a radially inner side thereof within a crimping range along an axial direction of the socket in the state where the hose is inserted into the annular space (see Japan Unexamined Patent Publication No. 2014-081024).

Heretofore, the hose connector fitting attached to the end of the hose is inspected by manually measuring the outer diameter of the socket at the crimped area and the crimping position of the socket in the longitudinal direction of the socket at the crimped area using a caliper, and calculating the cylindricity or the circularity based on the measured outer diameter.

The measurement data thus obtained, such as the outer diameter, the crimping position, the cylindricity, and the circularity, is compared with a reference range to determine the acceptability of the hose connector fitting.

However, such manual measurement using a caliper results in wide variation in measurement data and insufficient reproducibility of measurement data and thus, there is room for improvement for reliably and efficiently determining the acceptability of the hose connector fitting.

SUMMARY

The present technology provides a shape measuring device for a hose connector fitting, a shape measuring method for a hose connector fitting, and a shape measuring program for a hose connector fitting that has a small variation in measurement data and improved reproducibility of measurement data, which is advantageous in determining the acceptability of the hose connector fitting reliably and efficiently.

The present technology provides a shape measuring device for a hose connector fitting in which an outer circumferential surface of a socket is crimped toward a radially inner side within a crimping range along an axial direction of the socket in a state where a hose is inserted into an annular space between an outer circumferential portion of a nipple and an inner circumferential portion of the socket, and the shape measuring device includes: a distance data detecting unit configured to detect distance data on a distance to a surface of the socket in a range including at least the entire crimping range; a shape data generating unit configured to generate shape data representing three-dimensional shape of the surface of the socket based on the distance data; and a measurement data calculating unit configured to calculate measurement data on a crimping state of the socket based on the shape data.

According to the present technology, since the three-dimensional shape of the surface of the socket is detected by the line sensor in a non-contact manner to calculate measurement data on the crimping state of the socket, as compared to the case where measurement data is manually obtained using a caliper as heretofore, the measurement data has less variation, which is advantageous in improving the reproducibility of the measurement data.

BRIEF DESCRIPTION OF DRAWINGS

FIG. 13 are diagrams illustrating examples of cross-sectional data.

FIG. 14 is a diagram illustrating an example of shape data generated from distance data.

FIG. 17 are diagrams illustrating computing expressions in core displacement correcting processing.

FIG. 18 are diagrams schematically illustrating the core displacement correcting processing.

FIG. 19 is a diagram schematically illustrating the core displacement correcting processing.

FIG. 20 is a diagram illustrating an example of cross-sectional data along the axial direction.

DETAILED DESCRIPTION

An embodiment of the present technology will be described below with reference to the drawings.

First, a hose connector fitting to be attached to an end of a hose will be described.

Figure 1:
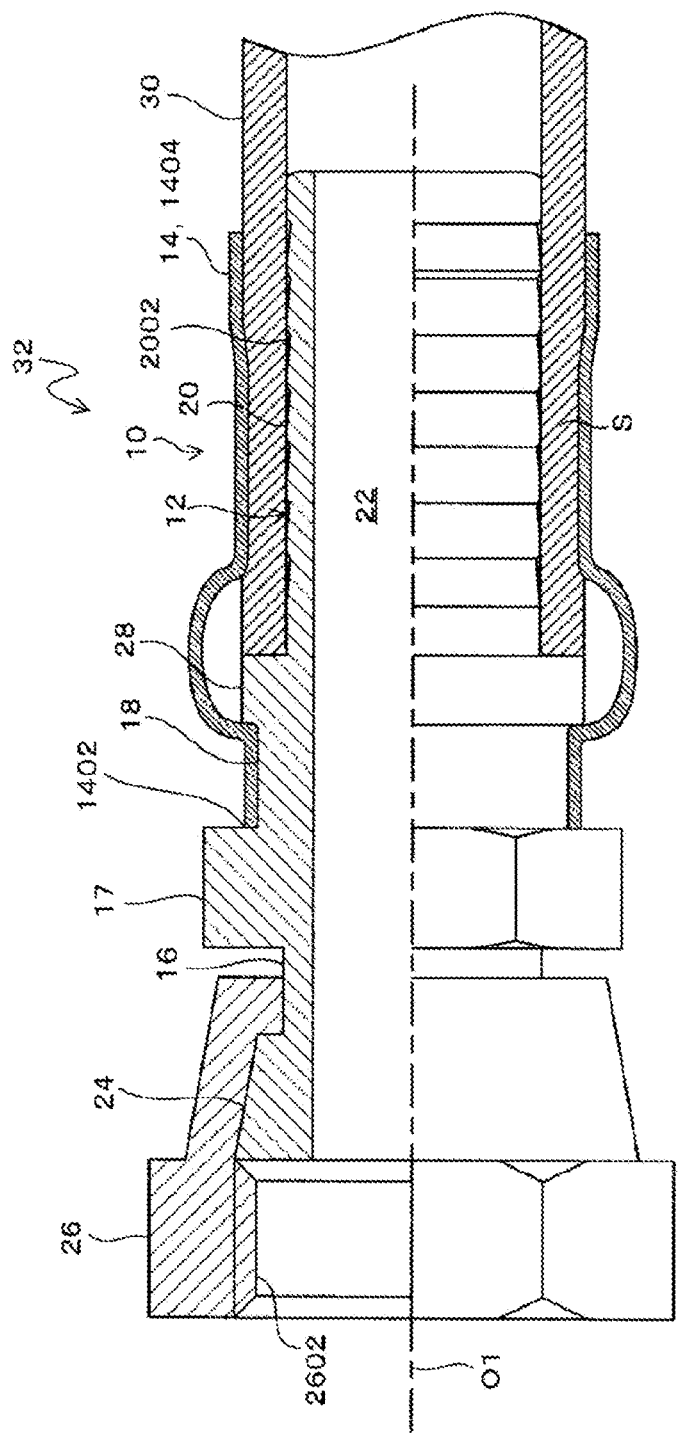
FIG. 1 is a partially cutaway side view of a hose connector fitting and a hose.

As illustrated in FIG. 1, a hose connector fitting 10 includes a metal nipple 12 and a metal socket 14.

The nipple 12 includes a base portion 16, a hexagonal portion 17, a socket crimping concave portion 18, and a core tube portion 20, which are coaxially arranged, and a hole 22 for feeding fluid penetrates into the base portion 16, the hexagonal portion 17, the socket crimping concave portion 18, and the core tube portion 20 along axes thereof.

The base portion 16 is a portion detachably coupled to the equipment, and includes a collar 24 and a nut 26 rotatably provided on the collar 24, and in the present embodiment, the base portion is the female-type base portion 16.

The nut 26 is a portion coupled to an external screw of mating equipment, and the inner circumferential portion thereof serves as a female screw 2602.

Note that the base portions 16 can have various forms including female and male types, and regardless of the configuration of the base portion 16, the present technology can be applied to a hose connector fitting 10 provided with various types of nipples 12 known in the art.

The hexagonal portion 17 and the socket crimping concave portion 18 are provided coaxially with the base portions 16.

In the present embodiment, a large-diameter portion 28 is opposed to the hexagonal portion 17, and the socket crimping concave portion 18 is continuously provided between the large-diameter portion 28 and the hexagonal portion 17 in the axial direction and the entire circumferential direction.

The core tube portion 20 protrudes from the large-diameter portion 28 and is coupled to the end of the hose 30.

A plurality of hose retaining concave portions 2002 are provided on an outer circumferential surface of the core tube portion 20, and the concave portions 2002 are continuous in the circumferential direction of the core tube portion 20.

The socket 14 is attached to the nipple 12 by covering the socket over the core tube portion 20 of the nipple 12, the large-diameter portion 28, and the socket crimping concave portion 18 and crimping the periphery of an end 1402 of the socket 14 on the side of socket crimping concave portion 18 onto the socket crimping concave portion 18.

When the socket 14 is attached to the nipple 12 in this manner, an annular space S, into which the end of the hose 30 is inserted, is formed between the outer circumferential surface of the core tube portion 20 and the inner circumferential surface of the socket 14 opposed to the outer circumferential surface.

The annular space S is opened to the nipple 12 and an end 1404 of the socket 14, which are located opposite to the large-diameter portion 28.

The hose 30 is made of, for example, rubber and is flexible.

The hose 30 includes, for example, an inner rubber layer, a reinforcing layer formed on the outer side of the inner rubber layer, and an outer rubber layer formed on the outer side of the reinforcing layer.

In the state where the hose 30 inserted into the annular space S, the socket 14 is crimped toward the radially inner side within a crimping range along the axial direction of the socket 14. As a result, the hose connector fitting 10 is attached to the hose 30 in the state where the entire inner circumferential surface of the inner rubber layer of the hose 30 is in close contact with the entire outer circumferential surface of the nipple 12.

Figure 9:
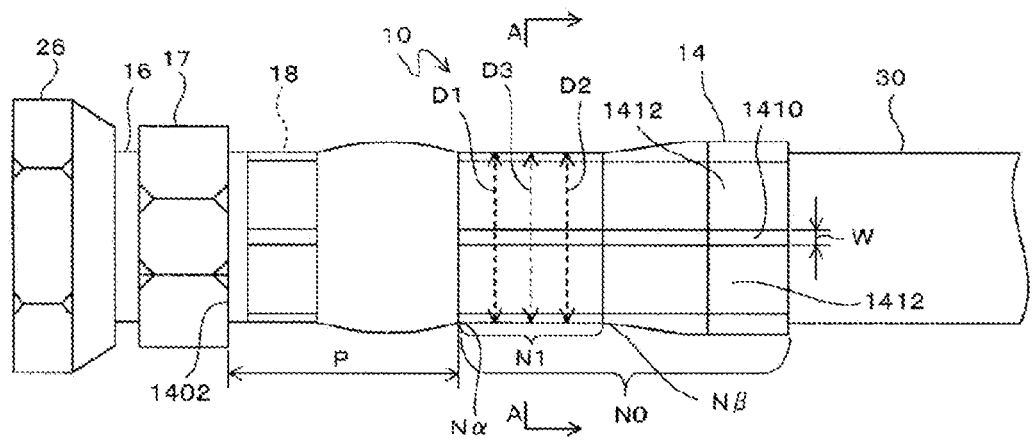
FIG. 9 is a first drawing for describing definitions of measurement data of hose connector fitting.
Figure 10:
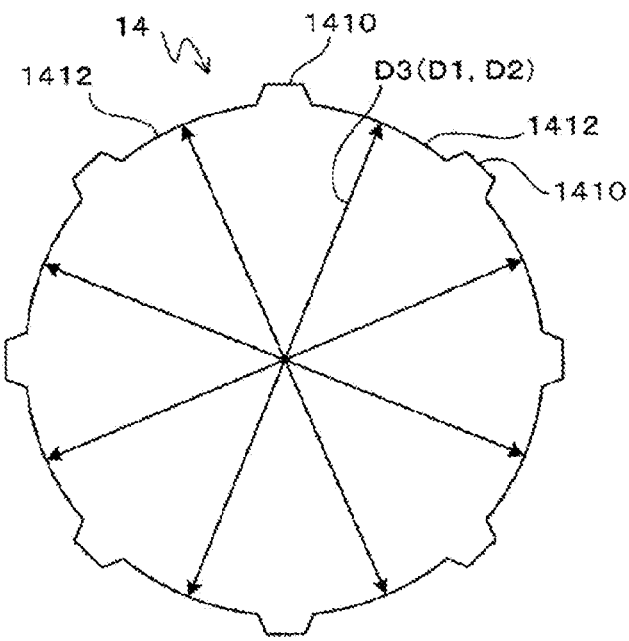
FIG. 10 is a second drawing for describing definitions of measurement data of the hose connector fitting, and is a drawing corresponding to the cross section taken by a line A-A in FIG. 9 and illustrating only the contour of the surface of the socket.

Note that, in the present embodiment, as illustrated in FIG. 9 and FIG. 10, by crimping the socket 14, convex portions 1410 and concave portions 1412, which extend in the axial direction of the socket 14, are alternately arranged in the circumferential direction of the socket 14, and as illustrated in FIG. 1, the axial cross-sectional shape of the socket 14 is substantially flat. However, the crimping may have any configuration and can adopt various known crimping configurations, for example, wave crimping configuration in which the convex portions and the concave portions that extend in the circumferential direction of the socket 14 are alternately arranged in the axial direction of the socket 14 and the axial cross-sectional shape of the socket 14 is wave-shaped.

In addition, in the present embodiment, the crimping range N0 has a flared configuration. That is, a crimping range N0 at which the crimping tab abuts at crimping includes a main crimping range N1 that is smaller than residual crimping range on the side of the base portion 16, and the diameter gradually becomes larger than in the main crimping range N1 from the main crimping range N1 toward the hose 30. The main crimping range N1 is also smaller in diameter than the other areas of the socket 14.

Further, the hose 30 may be made of rubber, synthetic resin, or various materials known as materials for the hose 30.

Thus, an assembly 32 consisting of the hose 30 and the hose connector fitting 10 is obtained.

Next, a shape measuring device for a hose connector fitting (hereinafter referred to as shape measuring device) will be described.

Figure 2:
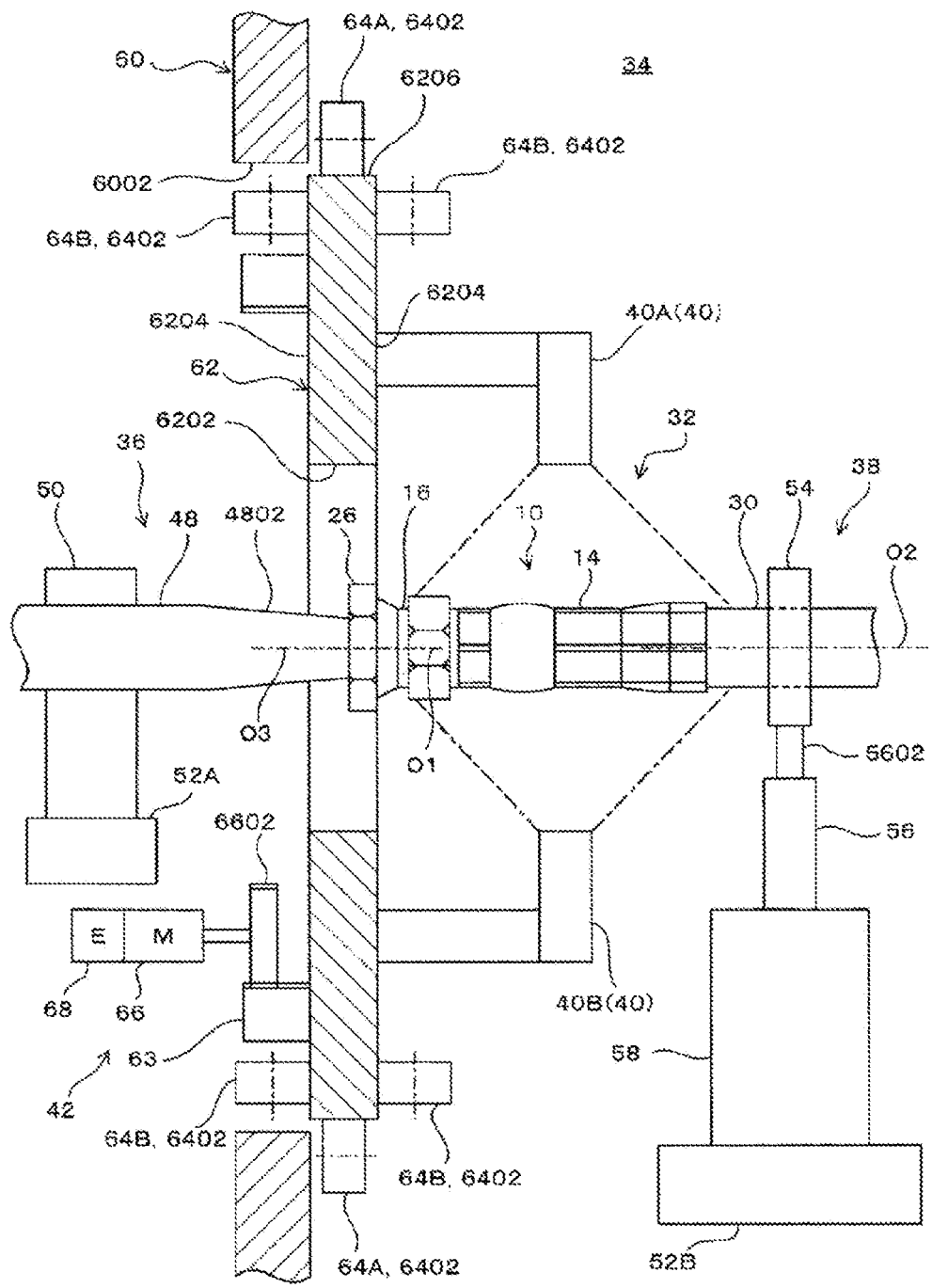
FIG. 2 is a longitudinal cross-sectional view of a shape measuring device for a hose connector fitting according to an embodiment.
Figure 8:
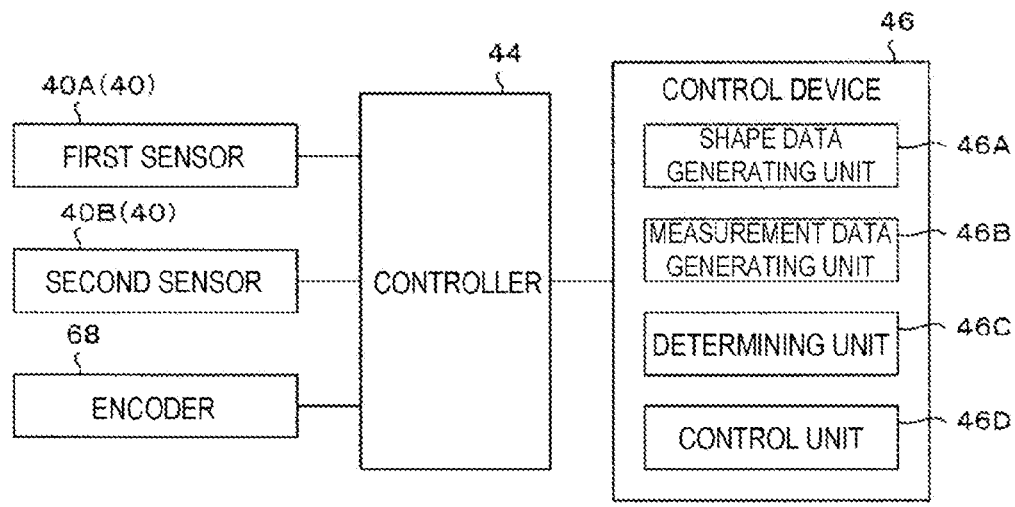
FIG. 8 is a block diagram illustrating the shape measuring device for a hose connector fitting according to the embodiment.

As illustrated in FIG. 2, a shape measuring device 34 includes a fitting support portion 36, a hose support portion 38, a sensor 40, a rotational moving unit 42, a controller 44 (FIG. 8), and a control device 46 (FIG. 8).

The fitting support portion 36 supports the fitting with an axis O1 of the nipple 12 of the hose connector fitting 10 of the assembly 32, that is, the axis O1 of the hose connector fitting 10 being positioned.

The fitting support portion 36 includes a shaft member 48 and a fitting-side support member 50 that supports the shaft member 48.

The shaft member 48 is provided with an engaging portion 4802 at a tip thereof, and the engaging portion is formed of a conical surface that engages with the hole 22 in the base portion 16 of the nipple 12 of the hose connector fitting 10 of the assembly 32 to position the axis O1 of the hose connector fitting 10.

The shaft member 48 is supported by the fitting-side support member 50 with its axis horizontally oriented.

The fitting-side support member 50 is supported by a three-axis table 52A mounted on a horizontal surface, and the fitting-side support member 50 can be adjusted in μm in each of X-axis and Y-axis directions that are orthogonal to each other, and a Z-axis direction that is the vertical direction.

The hose support portion 38 supports the hose 30 with an axis O2 of the hose 30 of the assembly 32 being positioned.

Figure 4:
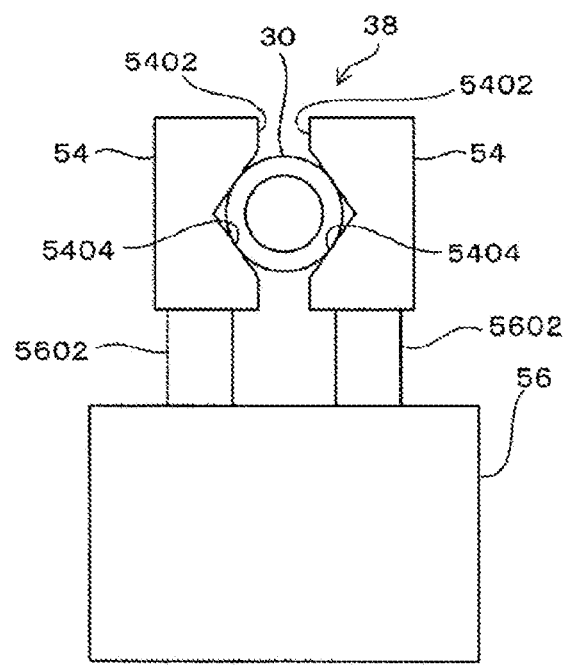
FIG. 4 is a front view of a hose support portion.

As illustrated in FIG. 2 and FIG. 4, the hose support portion 38 includes a pair of clamping members 54, an actuator 56, and a hose-side support member 58.

The pair of clamping members 54 have respective V-shaped grooves 5404 in opposed surfaces 5402, and the grooves engage with the outer circumferential surface of the hose 30 of the assembly 32 to position the axis O2 of the hose 30.

In the present embodiment, the actuator 56 has a parallel hand that parallelly moves a pair of arms 5602 closer to and away from each other.

The pair of clamping members 54 are attached to the pair of arms 5602, and the actuator 56 horizontally moves the pair of clamping members 54 closer and away from each other, thereby moving the pair of clamping members 54 between a clamped position where the outer circumferential surface of the hose 30 of the assembly 32 is clamped and an unclamped position where the clamping is released.

The hose-side support member 58 supports the actuator 56 such that the opposing surfaces 5402 of the pair of clamping members 54 extend in the vertical direction and the V-shaped grooves 5404 of the pair of clamping members 54 extend in the horizontal direction.

The hose-side support member 58 is supported by a three-axis table 52B mounted on a horizontal surface, and the hose-side support member 58 can be adjusted in μm in each of the X-axis and Y-axis directions that are orthogonal to each other, and the Z-axis direction that is the vertical direction.

In a state where the fitting support portion 36 supports the nipple 12 and the hose support portion 38 supports the hose 30, the axis O1 of the hose connector fitting 10, the axis O2 of the hose 30, and an axis O3 of a rotating plate 62 described below are adjusted by the three-axis table 52A supporting the fitting-side support member 50 and the three-axis table 52B supporting the hose-side support member 58 such that the positions of the axis coincide with one another.

Figure 5:
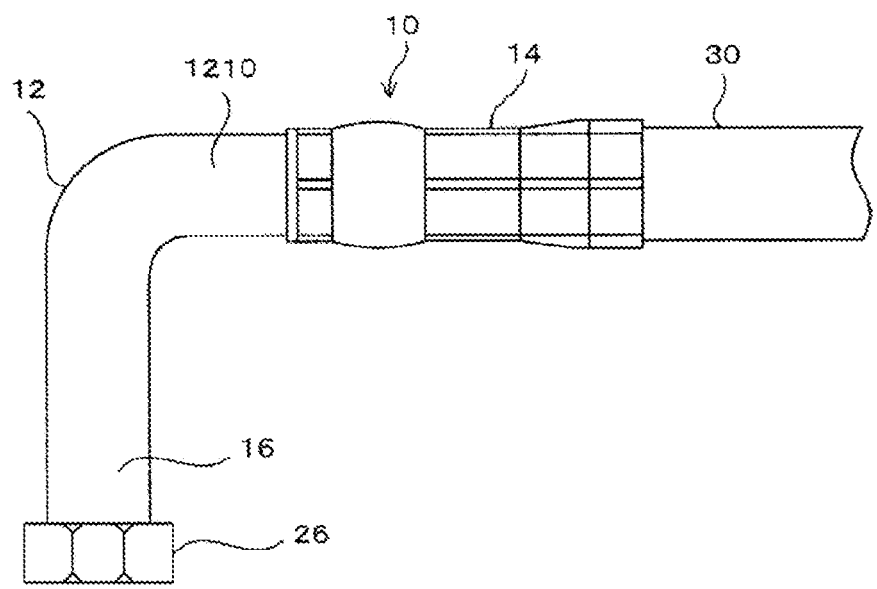
FIG. 5 is a side view illustrating an example of a bend-type hose connector fitting.

Note that in the case of the bend-type hose connector fitting 10 including the bent nipple 12 as illustrated in FIG. 5, the fitting support portion 36 may use the pair of clamping members 54 having the V-shaped grooves 5404 to support the outer circumferential surface of a portion 1210 of the nipple 12 near the socket 14 in the same manner as the hose support portion 38.

As illustrated in FIG. 2, the rotational moving unit 42 causes sensors 40 to rotate and move about the axis of the hose connector fitting 10 such that the sensors 40 can detect distance data on the distance to the surface of the socket 14 throughout the entire circumference of the socket 14.

Figure 3:
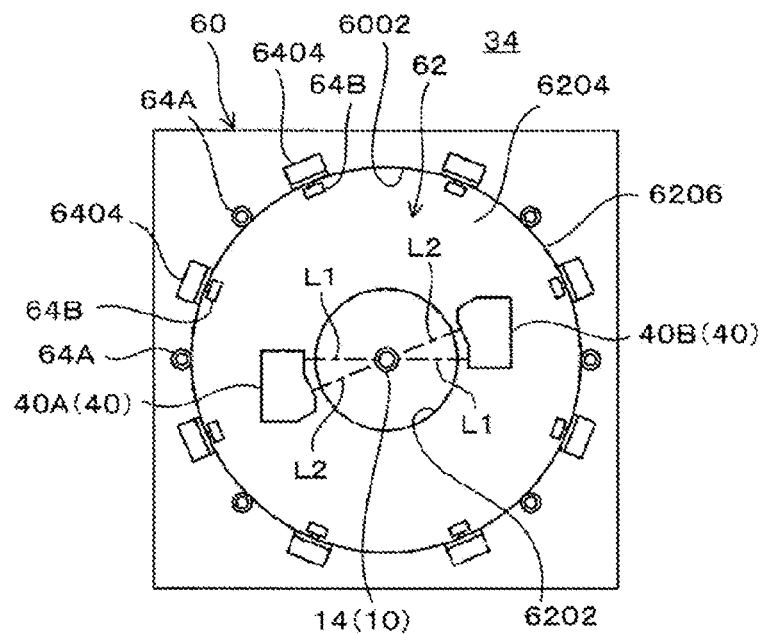
FIG. 3 is a front view of the shape measuring device for a hose connector fitting according to the embodiment.

As illustrated in FIG. 2 and FIG. 3, in the present embodiment, the rotational moving unit 42 includes a base 60, a rotating plate 62, a rotational support mechanism 64, and a motor 66.

The base 60 is a rectangular plate having uniform thickness, and is supported by a frame (not illustrated) with the thickness direction being horizontally oriented.

A circular base hole 6002 penetrating in the thickness direction is formed at the center of the base 60.

The rotating plate 62 is a disk-shaped plate having uniform thickness.

The rotating plate 62 includes a hole 6202 sized to insert the assembly 32 therethrough at the center thereof, a pair of annular side surfaces 6204 located on both sides in the thickness direction, and an outer circumferential surface 6206 that connects outer circumferential portions of the pair of annular side surfaces 6204 to each other.

The rotating plate 62 is rotatably supported on the base 60 via the rotational support mechanism 64 in the state where the axis O3 is aligned with the axis of the base hole 6002.

A ring gear 63 extending concentrically with the rotating plate 62 is provided on one side surface 6204 of the rotating plate 62, and teeth are formed on an inner circumferential portion of the ring gear 63.

The rotational support mechanism 64 is configured of a plurality of first cam followers 64A and a plurality of second cam followers 64B, which are provided on the base 60 at intervals in the circumferential direction of the base hole 6002.

The first cam followers 64A and the second cam followers 64B each include a shaft (not illustrated) and a cylindrical ring 6402 rotatably coupled to the shaft.

The shafts of the plurality of first cam followers 64A are adjustably attached to the respective positions of the base 60 around the base hole 6002, such that the first cam followers 64A are circumferentially spaced on the outer circumferential surface 6206 of the rotating plate 62.

The shafts of the plurality of second cam followers 64B are adjustably attached to respective brackets 6404, such that the second cam followers 64B are circumferentially spaced on the outer circumferential surface 6206 of the rotating plate 62, and the brackets are supported at respective positions of the base 60 around the base hole 6002.

Although both the first cam followers and second cam followers 64B are illustrated in FIG. 2 for convenience, the first cam follower 64A and the second cam follower 64B are offset in phase in the circumferential direction of the rotating plate 62.

The plurality of first cam followers 64A engage with the outer circumferential surface 6206 at the plurality of positions spaced at intervals in the circumferential direction of the outer circumferential surface 6206 of the rotating plate 62 to determine the position in a direction orthogonal to the axis O3 of the rotating plate 62.

The plurality of second cam followers 64B engage with the side surfaces 6204 on both sides of the rotating plate 62 at the plurality of locations spaced at intervals in the circumferential direction of the outer circumferential surface 6206 of the rotating plate 62 to determine the position in the direction of the axis O3 of the rotating plate 62.

Thus, the rotating plate 62 has its axis determined by the plurality of first cam followers 64A and the plurality of second cam followers 64B, and the axis O3 of the rotating plate 62 is adjustably positioned by the plurality of first cam followers 64A and the plurality of second cam followers 64B.

The motor 66 transmits a rotational driving force to the ring gear 63 via a driving gear 6602 attached to a driving shaft thereof, and is attached to the base 60 via an attachment fitting (not illustrated).

The motor 66 includes an encoder 68 that generates a detection signal (pulse signal) corresponding to its amount of rotation.

Thus, the rotation of the motor 66 causes the rotating plate 62 to rotate about the axis O3 via the driving gear 6602 and the ring 6402 gear 63. In other words, the rotating plate 62 is driven to rotate about the axis O2 of the hose 30 and the axis O1 of the hose connector fitting 10.

In addition, in the present embodiment, backlash is suppressed by using a control backlash gear, a no-back lash gear, or the like as the driving gear 6602.

This eliminates any backlash of the sensors (two-dimensional shape detecting portion) 40 that rotates about the axis O1 of the hose connector fitting 10 to ensure the accuracy of the rotational angle, thereby improving the accuracy of position data on the socket 14 with respect to the axis O1 of the hose connector fitting 10 in the radial direction, which is obtained by the sensors 40.

Note that in the present embodiment, the rotational moving unit 42 causes the sensors 40 to rotate about the axis of the hose connector fitting 10 using the ring gear 63 and the driving gear 6602 and however, the rotational moving unit 42 is only required to cause the sensors 40 to rotate about the axis of the hose connector fitting 10 and may be have any configuration.

For example, various known rotational driving mechanism rotary drive mechanisms can be used as a mechanism for transmitting rotational driving force to the rotating plate 62, such as a drive pulley driven by the motor 66, a driven pulley that provides a rotational driving force to the rotating plate 62, and a timing belt looped between the pulleys.

The sensors (line sensors) 40 detects distance data on the distance to the surface of the socket 14, and in the present embodiment, detects linear distance data on the distance to the surface of the socket 14 along the extending direction of the axis O1 of the hose connector fitting 10.

Figure 6:
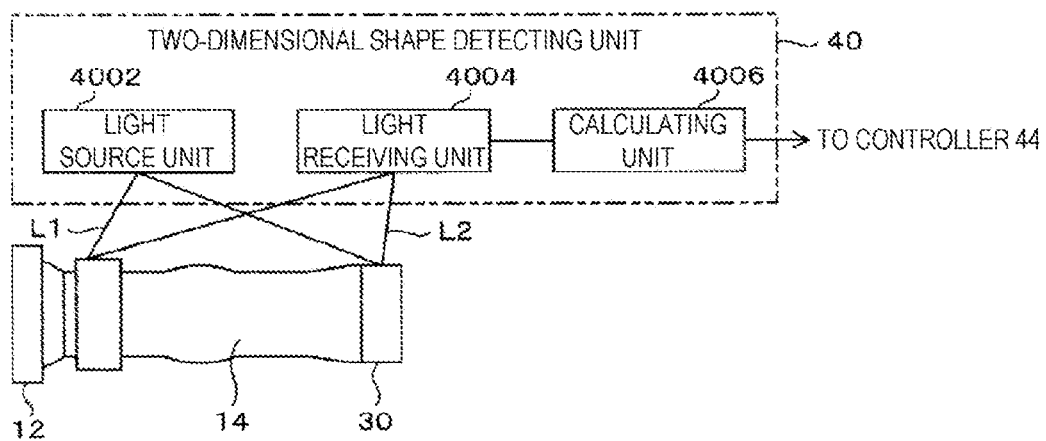
FIG. 6 is a block diagram illustrating a configuration of a two-dimensional shape detecting unit.

As illustrated in FIG. 6, the sensors 40 each include a light source unit 4002, a light receiving unit 4004, and a calculating unit 4006.

The light source unit 4002 irradiates the surface of the socket 14 with band-like detection light L1 (detection line) having a width that passes in the extending direction of the axis O3 (rotational center of the sensors 40) of the rotating plate 62. As described above, since the axis O1 of the hose connector fitting 10 is positioned so as to coincide with the axis O3 of the rotating plate 62, it can be said that the light source unit 4002 irradiates the surface of the socket 14 with the band-like detection light L1 along the extending direction of the axis O1 of the hose connector fitting 10. Here, the above-mentioned "along" indicates that the extending direction of the detection light L1 (detection line) is substantially the same as the extending direction of the axis O1 of the hose connector fitting 10 but may include an error.

The detection light L1 emitted from the light source unit 4002 illuminates the surface of the socket 14 in the form of line.

Laser light, in the present embodiment, blue laser light is used as the detection light L1.

The blue laser is advantageous for increasing the detection accuracy with less diffused reflection when emitted to the surface of the socket 14.

The light receiving unit 4004 includes a light receiving lens and a CMOS (complementary metal-oxide-semiconductor) sensor, and receives reflected light L2 reflected on the surface of the socket 14.

The calculating unit 4006 calculates linear distance data on the distance to the surface of the socket 14 based on the optical triangulation method.

FIG. 13A is an explanatory diagram schematically illustrating distance data obtained by the sensors 40.

In FIG. 13A, a vertical axis represents a distance from the sensors 40 and the distance from the sensor 40 becomes shorter toward the upper side of the sheet. A horizontal axis represents a position on the socket 14 along the extending direction of the axis O1 of the hose connector fitting 10.

The surface shape of the workpiece can be identified by continuously measuring the distance from the sensor 40 to the surface of the workpiece (socket 14).

In the present embodiment, the two sensors 40, that is, the first and second sensors 40A, 40B, are attached to the rotating plate 62 at the same radial position of the rotating plate 62 and at positions spaced at intervals in the circumferential direction of the rotating plate 62, and thus the first and second sensors 40A, 40B are attached to the rotating plate 62 with a shift by 180 degrees in phase.

Thus, the rotational moving unit 42 can rotate the rotating plate 62 by 180 degrees, thereby causing the first and second sensors 40A, 40B to detect the linear distance data on the distance to the surface of the socket 14 along the extending direction of the axis O1 of the hose connector fitting 10 over the entire circumference of the socket 14.

In other words, in the present embodiment, the sensors 40 and the rotational moving unit 42 realize a distance data detecting unit in the claims.

Note that the number of sensors 40 may be one, and in this case, to cause the one sensor 40 to detect the distance data on the distance to the socket 14 over the entire circumference of the socket 14, the rotational moving unit 42 may rotate the rotating plate 62 by 360 degrees.

Note that the number of sensors 40 may be three, and in this case, to cause the three sensors 40 to detect the distance data on the distance to the socket 14 over the entire circumference of the socket 14, the rotational moving unit 42 may rotate the rotating plate 62 by 120 degrees.

In short, the greater the number of sensors 40, the smaller the amount of rotation of the rotating plate 62, which is advantageous in shortening the time required to detect the distance data on the distance to the socket 14 over the entire circumference of the socket 14.

Further, in the present embodiment, the sensors 40 irradiates the surface with the band-like detection light L1 along the extending direction of the axis O3 (≈the axis O1 of the hose connector fitting 10) of the rotating plate 62 and circumferentially scans the hose connector fitting 10 to obtain distance data over the entire circumference. However, the scanning direction of the detection light is not limited to this. For example, band-like detection light may be emitted along the direction perpendicular to the extending direction of the axis O1 of the hose connector fitting 10, and scan the hose connector fitting 10 in the extending direction to obtain distance data. In addition, for example, an area sensor may be used to detect the distance data.

Note that the detection range of the distance data by the sensors 40 includes at least the entire crimping range.

As illustrated in FIG. 8, the controller 44 is connected to the encoder 68 and the first and second sensors 40A. 40B via a cable (not illustrated).

The controller 44 receives a detection signal corresponding to the amount of rotation of the motor 66 from the encoder 68 as well as the distance data on the distance from the first and second sensors 40 to the socket 14, and generates data by synchronizing the angular position in the circumferential direction of the socket 14 with the distance data on the distance to the socket 14, that is, position data along the longitudinal direction of the socket 14, which is associated with the angular position of the socket 14 in the circumferential direction.

Figure 7:
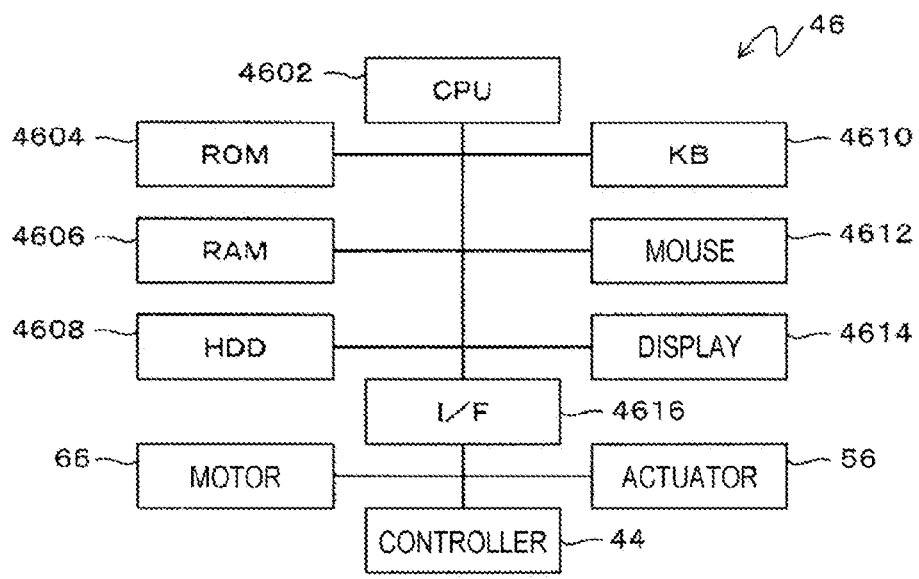
FIG. 7 is a block diagram illustrating a personal computer constituting a control device.

As illustrated in FIG. 7, the control device 46 is configured of a personal computer, and includes a CPU (central processing unit) 4602, and a ROM (read only memory) 4604, a RAM (random access memory) 4606, a hard disk device (HDD) 4608, a keyboard (KB) 4610, a mouse 4612, a display 4614, and an interface (I/F) 4616, which are connected to the CPU via an interface circuit (not illustrated) and a bus line.

The ROM 4604 stores a control programs and the like, and the RAM 4606 provides a working area.

The hard disk device 4608 stores a shape data generating unit 46A, a measurement data calculating unit 46B, a determining unit 46C, and a shape measuring program for a hose connector fitting for realizing a control unit 46D, and the like, which will be described later.

The keyboard 4610 and the mouse 4612 accept an operation input by the operator.

The display 4614 displays and outputs data.

The interface 4616 functions to transmit/receive data and signals to/from external equipment, and in this embodiment, the interface 4616 receives distance data associated with the circumferential angular position of the socket 14 from the controller 44, and provides control signals to the actuator 56 and the motor 66.

The CPU 4602 executes the shape measuring program stored in the hard disk device 4608, thereby causing the control device 46 (computer) to realize the shape data generating unit 46A, the measurement data calculating unit 46B, the determining unit 46C, and the control device 46D, as illustrated in FIG. 8.

The shape data generating unit 46A generates shape data representing the three-dimensional shape of the surface of the socket 14 based on the distance data detected over the entire circumference of the socket 14 by the sensors 40.

An example of the shape data generated from the distance data is illustrated in FIG. 14.

FIG. 14 is an exploded view illustrating the profile shape of the socket, in which distance data for the half circumferential portion (180 degrees) of the socket 14 is linearly arranged, and displayed as numerical value (height from the socket surface) in gray-scale. The shape data of the entire socket 14 can be also obtained by circumferentially arranging distance data over the entire circumference.

The measurement data calculating unit 46B calculates measurement data on the crimping state of the socket 14 based on the shape data.

In the present embodiment, following parameters are calculated as measurement data on the crimping state of the socket 14. A total of 28 pieces of measurement data are calculated for each hose connector fitting 10.

Note that the measurement data is not limited to those illustrated below, and as a matter of course, may be set as appropriate.

<Type of Measurement Data>
(1) Outer Diameter of Socket 14

As illustrated in FIG. 9, outer diameters of the socket 14 at three different positions in the longitudinal direction of the socket 14 in the crimping range (in particular, the main crimping range N1) are defined as first, second, and third outer diameters D1, D2, and D3.

The longitudinal positions of the first, second, third outer diameters D1, D2, D3 of the socket 14 each are defined, for example, as the distance from both ends in the main crimping range N1 (a base-side main crimping end Nα and a hose-side main crimping end Nβ). Of the ends of the main crimping range N1, the end closer to the base portion 16 is referred to as the base-side main crimping end Nα and the end closer to the hose 30 is referred to as the hose-side main crimping end Nβ.

Also, as illustrated in FIG. 10, four dimensions for each of the first, second, and third outer diameters D1, D2, and D3 are measured every 45 degrees in the circumferential direction of the socket 14. Note that, as described above, the convex portions 1410 and the concave portions 1412 are included in the main crimping range N1 and have different outer diameters, and in the present embodiment, the outer diameter of the concave portions 1412, at which the crimping tabs abut at crimping.

Thus, the outer diameter is measured at 12 positions in total.

(2) Crimping Position

As illustrated in FIG. 9, the distance between the end 1402 of the socket 14 on the side of the socket crimping concave portion 18 and the position closer to the base portion 16 (the base-side main crimping end Na) in the crimping range (crimping range NO) of the socket 14 is defined as a crimping position P.

In addition, eight crimping positions P are measured every 45 degrees in the circumferential direction of the socket 14.

(3) Crimping Tab Residual Width

As illustrated in FIG. 9 and FIG. 10, a circumferential distance of each of the convex portions 1410 formed along the longitudinal direction and at intervals in the circumferential direction of the socket 14 is defined as a crimping tab residual width W.

In the present embodiment, since the eight crimping tabs are used, the eight crimping tab residual widths W are measured.

(4) Circularity

A difference between a maximum value and a minimum value of the third outer diameter D3 is defined as circularity.

Thus, one circularity is measured.

(5) Cylindricity

A difference between the first outer diameter D1 and the second outer diameter D2 is defined as cylindricity.

Since four dimensions for the first outer diameter D1 and the second outer diameter D2 are measured very 45 degrees in the circumferential direction of the socket 14, four values of the cylindricity are calculated every 45 degrees in the circumferential direction of the socket 14, and the maximum value among the values is defined as a representative cylindricity.

The determining unit 46C compares the measurement data with a predetermined reference range to determine the acceptability of the crimping state of the socket 14.

The determination result of the acceptability is displayed on, for example, the display of the control device 46, or is displayed by a notification lamp that is connected to the control device 46 and installed at the work site.

The control unit 46D controls the actuator 56 and the motor 66.

Figure 11:
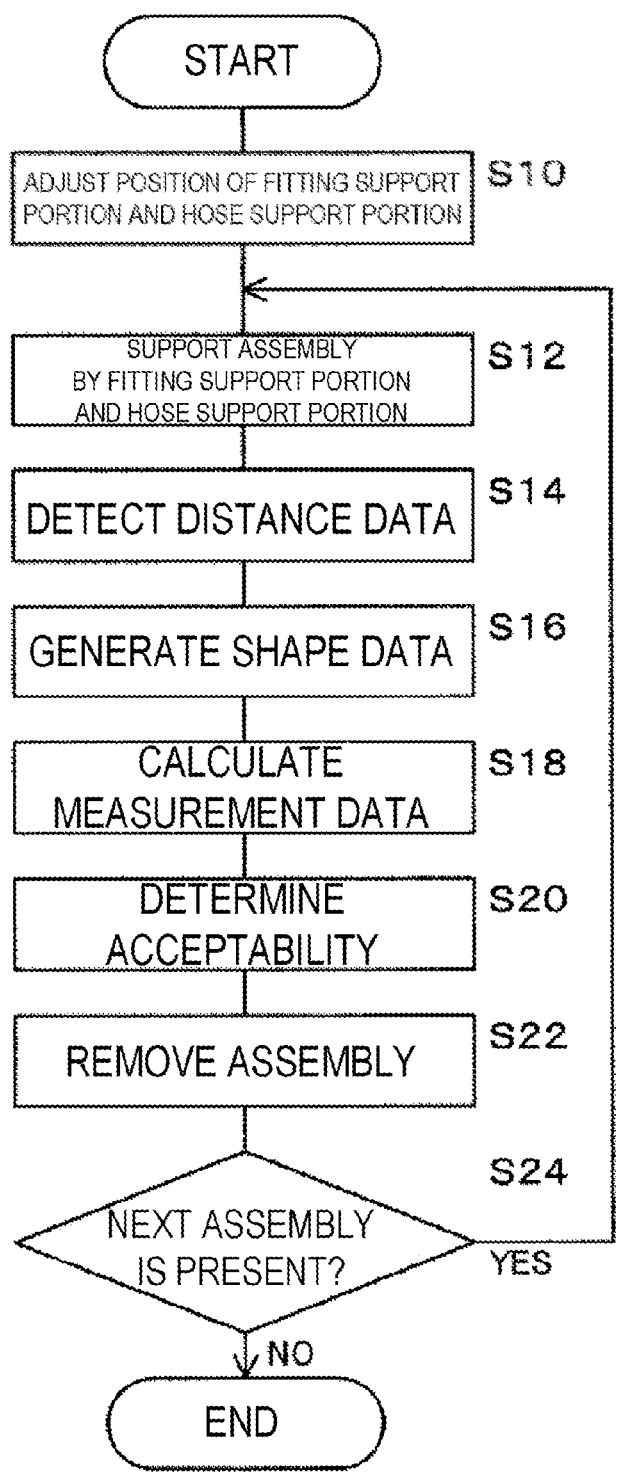
FIG. 11 is a flowchart illustrating operations of the shape measuring device for a hose connector fitting according to the embodiment.

Next, operations of the shape measuring device 34 will be described with reference to a flowchart of FIG. 11.

Prior to measurement using the shape measuring device 34, the positions of the fitting support portion 36 and the hose support portion 38 are adjusted (step S10).

The position of the fitting support portion 36 is adjusted as follows.

A dial gauge is fixed to the rotating plate 62, and a measurement element of the dial gauge is pressed onto the outer circumferential surface of the shaft member 48.

Next, the rotating plate 62 is rotated to measure an amount of displacement between the axis of the shaft member 48 and the axis O3 of the rotating plate 62 by the dial gauge, and the three-axis adjustment table 52A of the fitting support portion 36 is adjusted such that the amount of displacement is zero.

The position of the hose support portion 38 is adjusted as follows.

The hose support portion 38 supports a core metal linearly processed at high accuracy to have uniform outer diameter.

The dial gauge is fixed to the rotating plate 62, and a measurement element of the dial gauge is placed on the outer circumferential surface of the core die.

Next, the rotating plate 62 is rotated to measure an amount of displacement between the axis of the core metal and the axis O3 of the rotating plate 62 by the dial gauge, and the three-axis adjustment table 52B of the fitting support portion 36 is adjusted such that the amount of displacement is zero.

When the positions of the fitting support portion 36 and the hose support portion 38 have been adjusted, the dial gauge is removed from the rotating plate 62, and the core metal is removed from the hose support portion 38.

Next, the assembly 32 to be measured is supported by the fitting support portion 36 and the hose support portion 38 (step S12).

That is, the engaging portion 4802 of the fitting support portion 36 is engaged with the hole 6202 of the nipple 12 of the hose connector fitting 10 of the assembly 32 to be measured.

Next, when a portion of the hose 30 of the assembly 32 is positioned between the V-shaped grooves 5404 of the pair of clamping members 54 in the unclamped position of the hose support portion 38, the actuator 56 is actuated by the control of the control unit 46D to move the pair of clamping members 54 to the clamped position, thereby causing the portion of the hose 30 to be clamped between the V-shaped grooves 5404 of the pair of clamping members 54.

As a result, the axis O1 of the hose connector fitting 10 of the assembly 32 coincides with the axis O3 of the rotating plate 62.

Next, under control of the control unit 46D, the motor 66 is rotated to rotate the rotating plate 62 by 180 degrees, thereby causing the first and second sensors 40A, 40B to detect linear distance data on the distance to the surface of the socket 14 along the extending direction of the axis O1 of the hose connector fitting 10 over the entire circumference of the socket 14 (step S14).

Figure 23A:
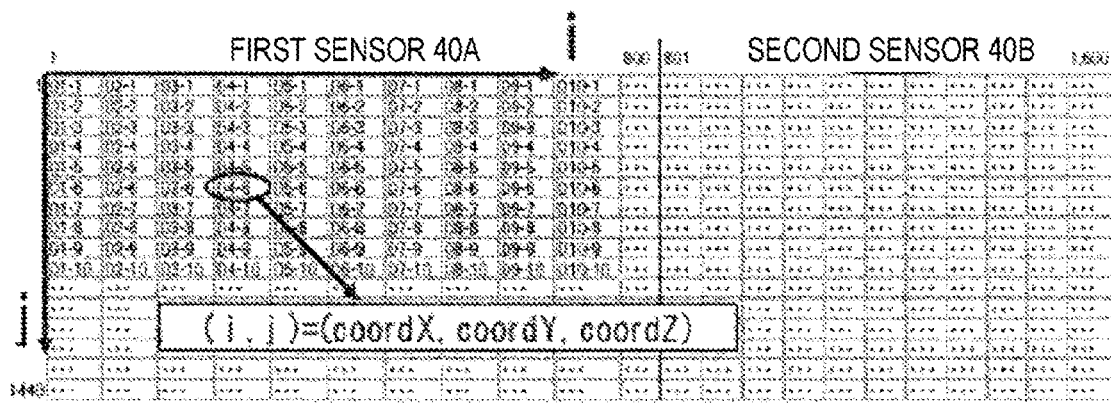
FIG. 23 are diagrams illustrating examples of profile data and transformed coordinates.

FIG. 23A is a diagram illustrating an example of a distance data group (profile data) detected by the first and second sensors 40A, 40B.

In the present embodiment, the number of detection points in one line (the extending direction of the axis O1) is 800, and the 800 pieces of distance data obtained on each line corresponds to each row of profile data illustrated in FIG. 23A. Detection results obtained by moving the first and second sensors 40A, 40B in the circumferential direction correspond to each column of the profile data illustrated in FIG. 23A.

That is, when the total number of columns of the profile data is defined as xSize, any column number i corresponds to coordinates in the axial direction (extending direction of the axis O1) of the detection point of the distance data included in the column as illustrated in Expression (1) in FIG. 17A. Also, assuming that the total number of rows of profile data is ySize, any row number j corresponds to coordinates in the circumferential direction of the detection point of the distance data included in that row as illustrated in Expression (2) in FIG. 17A. Note that in Expression (2) of FIG. 17A, PI is the ratio of the circumference of a circle to its diameter. That is, any position on the surface of the socket 14 may be identified by specifying column number i and row number j (specifying (i, j).

When the linear distance data on the distance to the surface of the socket 14 is detected over the entire circumference of the socket 14, the control device 46 may generate shape data representing the three-dimensional shape of the surface of the socket 14 based on the distance data detected over the entire circumference of the socket 14 by the first and second sensors 40A, 40B (step S16: shape data generating unit 46A).

Next, the control device 46 calculates measurement data on the crimping state of the socket 14 from the shape data (step S18: measurement data calculating unit 46B).

When the measurement data is calculated, the acceptability is determined based on the measurement data (step S20: determining unit 46C).

When the acceptability has been determined, the hose support portion 38 is operated to release clamping of the hose 30, to remove the assembly 32 from the fitting support portion 36 and the hose support portion 38 (step S22).

Then, it is determined whether or not a next assembly 32 is present (step S24).

When the step S24 is affirmative, the operation is stopped, and when the step S24 is negative, the procedure returns to the step S12 to make measurement of the next assembly 32.

The measurement of the assembly 32 is made by repeatedly performing such operations.

<Details of Method for Calculating Measurement Data>

Next, details of the method for calculating various measurement data, that is, the step S18 in FIG. 11: processing performed by the measurement data calculating unit 46B will be described.

Figure 12:
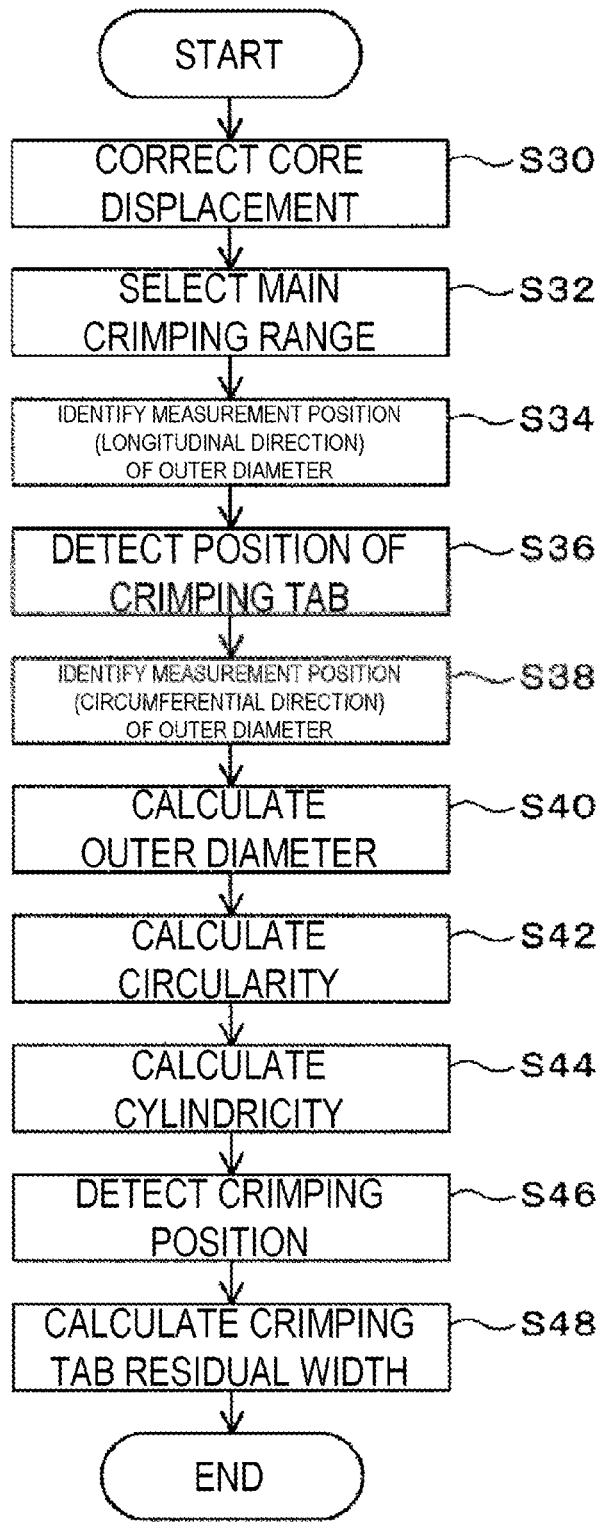
FIG. 12 is a flowchart illustrating measurement data calculating process.

FIG. 12 is a flowchart illustrating the measurement data calculating processing executed by the measurement data calculating unit 46B.

The measurement data calculating unit 46B first corrects the core displacement of the shape data (step S30).

Next, the measurement data calculating unit 46B detects the main crimping range N1 (step S32), and identifies the measurement position (longitudinal position of the socket 14) of the outer diameter of the socket 14, which is one of the measurement data (step S34).

Next, the measurement data calculating unit 46B detects the position of the convex portion 1410 that is not in contact with the crimping tab in the main crimping range N1 (step S36), and identifies the measurement position of the outer diameter of the socket 14 (circumferential position of the socket 14) (step S38).

Thereafter, the measurement data calculating unit 46B calculates the outer diameter of the socket 14 (step S40), and calculates the circularity (step S42) and the cylindricity (step S44) based on the outer diameter.

Further, the measurement data calculating unit 46B detects the crimping position (step S46), and calculates the crimping tab residual width, which is the distance along the circumferential direction of the convex portion 1410 (step S48), and terminates the processing according to the flowchart.

Details of each of the steps will be described below.

<Step S30: Core Displacement Correcting Processing>

As described above, at measurement of the distance data, the hose connector fitting 10 is supported by the fitting support portion 36 such that the axis O1 of the hose connector fitting 10 is aligned with the axis O3 of the rotating plate 62.

However, when the hose connector fitting 10 is attached to the fitting support portion 36, mechanical core displacement and core displacement caused by irregularity of the support area on the hose connector fitting 10 may occur.

Figure 15:
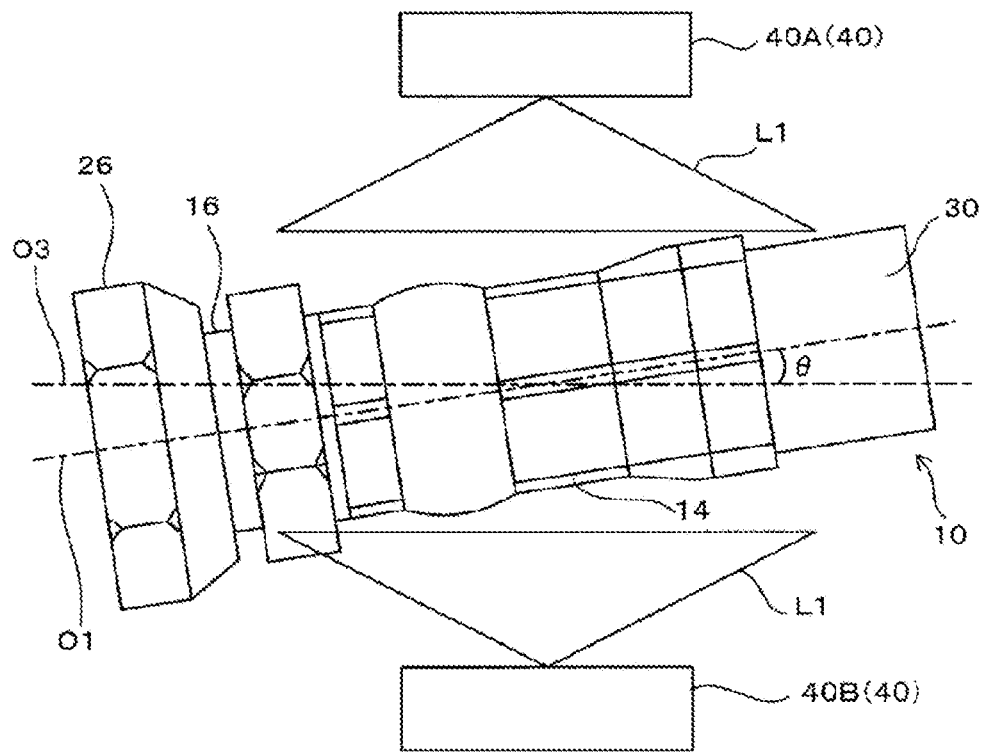
FIG. 15 is a diagram schematically illustrating core displacement at measurement of distance data.

That is, while the data detecting unit detects the distance data, the hose connector fitting 10 is supported such that the extending direction of the axis O1 is aligned with the detection line of the distance data (the axis O3 of the rotating plate 62) and however, as illustrated in FIG. 15, there is a possibility that they are not completely aligned. This misalignment is corrected in this step.

Specifically, the measurement data calculating unit 46B performs core displacement correction according to the following procedure.

1. Calculation of Center Coordinates 1-1. Shape data (first cross-sectional data) on the sliced round socket 14 is obtained at predetermined intervals in the longitudinal direction of the socket 14.

1-2. The outer diameter of the socket 14 is calculated for each cross-sectional data.

1-3. Polar coordinates of each point of distance data are transformed into three-dimensional Cartesian coordinates (XYZ coordinates).

Figure 16:
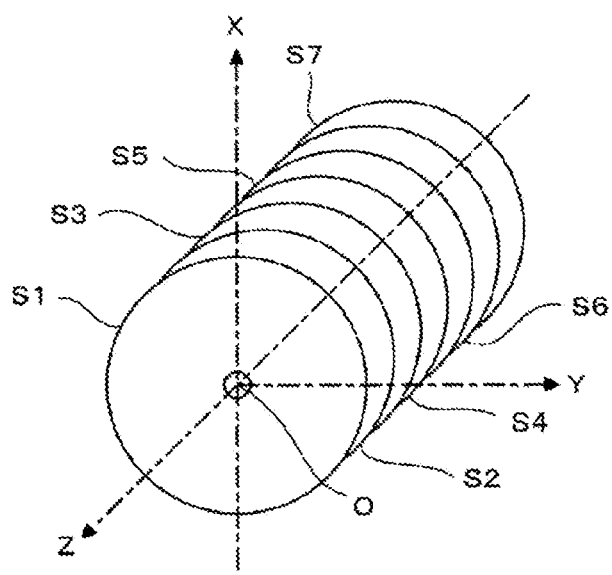
FIG. 16 is a diagram schematically illustrating a coordinate system at calculation.

In the present embodiment, as illustrated in FIG. 16, the longitudinal direction (axial direction) of the socket 14 is the Z-axis, the vertical direction thereof is the X-axis, and the horizontal direction thereof is the Y-axis. In FIG. 16, pieces of sliced cross-sectional data extracted at intervals in the longitudinal direction of the socket 14 are indicated by reference signs 51 to S7, and the center point of the cross-sectional data 51 are denoted by a reference sign O.

As described above, any position on the surface of the socket 14 may be identified by specifying (i, j) the column number i and the row number j (specifying (i, j)) of profile data illustrated in FIG. 23A. The (i, j) (more particularly, an angle rad calculated using i and j) are transformed to three-dimensional Cartesian coordinates (XYZ coordinates) using Expressions (3) to (5) of FIG. 17A.

Note that in Expression (5) of FIG. 17A, resolution is the resolution of the sensor 40 in the Z-axis direction. In the present embodiment, since the detection width of the sensor 40 is 40 mm and the number of detection points is 800, the value of resolution is 40 mm/800=0.05 mm/Point. Note that when the resolution of the sensor 40 varies, the value of the sensor 40 also varies.

Figure 23B:
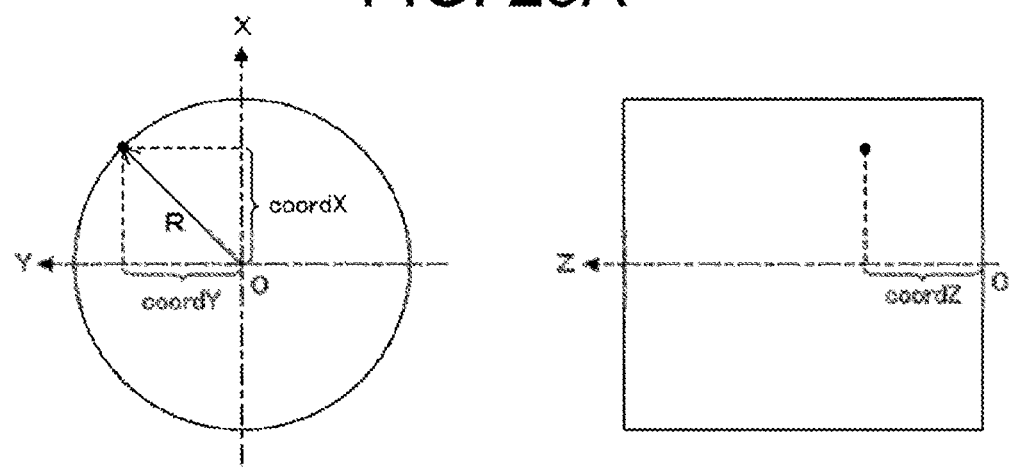

The transformed three-dimensional Cartesian coordinates are schematically illustrated in FIG. 23B.

1-4. Each cross-sectional data is approximated by the least squares method to calculate the center coordinates.

The calculation expression for the center coordinates is as illustrated in FIG. 17B.

Through the above-mentioned procedure, the center coordinates of the cross-sectional data can be calculated.

2. The center coordinates are corrected to be aligned on an imaginary axis O4 corresponding to the axis O3 (mechanical center) of the rotating plate 62.

2-1. The center coordinates of each cross section are approximated to a straight line L by the least squares method to calculate a gradient and an intercept on the ZY plane of the straight line L.

That is, as illustrated in FIG. 18A, assuming that the approximate expression (straight line L) of the center coordinates on the ZY plane is $y=z\alpha+\beta$, the gradient a and the intercept $\beta$ can be calculated by the expression illustrated in FIG. 17C.

2-2. The intercept $\beta$ is subtracted (see FIG. 18B). 2-3. The approximate expression is rotationally corrected in the X-axis direction using the expression in FIG. 17D. Accordingly, as illustrated in FIG. 19, lateral displacement of the center coordinates can be corrected. FIG. 19 illustrates that, when the socket 14 is viewed from the upper surface or lower surface side (X-axis side), the positional displacement in the left-right direction on the straight line L, which indicates the alignment of the center coordinates of each cross section, is corrected. That is, the straight line L0 is corrected by the intercept to become a straight line L1, and the straight line L1 is rotated about the X-axis to become a straight line L2.

2-4. The gradient and the intercept of the above straight line L2 on ZX plane are calculated.

The procedure is similar to 2-1. That is, assuming that the approximate expression of the center coordinates on the ZX plane is $x=z\alpha+\beta$, the gradient a and the intercept $\beta$ can be calculated by an expression in which y in the expression in FIG. 17 C is replaced with x.

2-5. The intercept $\beta$ is subtracted.

2-6. The approximation expression is rotated in the Y-axis direction using the expression y of the expression in which y in the expression in FIG. 17D is replaced with x. This can correct vertical displacement of the center coordinates.

That is, the measurement data calculating unit 46B extracts first cross-sectional data that cuts the surface of the socket 14 in a direction perpendicular to the axis O1 of the hose connector fitting 10 at predetermined intervals, and coincides the center points of the plurality of pieces of first cross-sectional data with the virtual axial direction to correct an error between the extending direction of the axis O1 of the hose connector fitting 10 and the distance data detection line direction in the state where the hose connector fitting 10 is supported by the fitting support portion 36.

<Step S32: Detection of Main Crimping Range>

As described above, the main crimping range (see the reference sign N1 in FIG. 9) is smaller than the other crimping ranges located on the side of the base portion 16 in the crimping range NO where the crimping tab abuts at crimping.

In this step, both ends of the main crimping range N1 (the base-side main crimping end Nα and the hose-side main crimping end Nβ) are detected. The procedure will be described below.

1. Cross-sectional data (second cross-sectional data) obtained by cutting the surface of the socket 14 along the longitudinal direction (axial direction of the hose connector fitting 10) is extracted. In the present embodiment, 24 pieces of cross-sectional data are extracted about the axis every 15 degrees.

2. For noise reduction, median filtering is executed.

3. A start point and an end point for detection of the main crimping range detection are set for filtered data.

FIG. 20 illustrates an example of second cross-sectional data.

In FIG. 20, the left side of the sheet is the side of the base portion 16, and the right side of the sheet is the side of the hose 30, a vertical axis represents a height with respect to the center axis, and a horizontal axis represents the position along the longitudinal direction of the socket 14 (position coordinates increasing from the base side toward the hose side). In the example of FIG. 20, a bending point located on the side of the base portion 16 is set to a start point T1 and the bending point located on the side of the hose 30 side is set to an end point T2.

4. A point at which a difference between the point and a laterally adjacent point in value (height) is a reference value or more is set as a temporary main crimping end. That is, for the base-side main crimping end Na, a difference between adjacent points in value (height) is sequentially calculated in the left direction of the sheet from an intermediate point T3 between the start point T1 and the end point T2 toward the start point T1, and the point having the difference of the reference value or more is defined as a temporary base-side main crimping end Na. In addition, for the hose-side main crimping end NO, a difference between adjacent points in value (height) is sequentially calculated in the left direction of the sheet from an intermediate point T3 between the start point T1 and the end point T2 toward the end point T2, and the point having the difference of the reference value or more is defined as a temporary hose-side main crimping end Nβ.

Note that, when no point at which a difference between the point and a laterally adjacent point in value (height) is the reference value or more is present, processing is terminated as a measurement error.

5. The above-mentioned processing 3 and 4 is applied to 24 pieces of cross-sectional data to detect positional coordinate values of the 24 temporary base-side main crimping ends Nα and positional coordinate values of the 24 temporary hose-side main crimping end Nβ.

For the base-side main crimping end Na, the 24 temporary base-side main crimping ends Nα are arranged in ascending order of positional coordinate values, and an average value of positional coordinate values of a predetermined number starting from a minimum value is defined as a true base-side main crimping end Nα.

For the hose-side main crimping end NO, a maximum value of the 24 temporary hose-side main crimping ends NO is defined as a true hose-side main crimping end Nβ.

That is, the measurement data calculating unit 46B extracts second cross-sectional data obtained by cutting the surface of the socket 14 along the axial direction of the hose connector fitting 10, and detects a point at which an amount of change in the cross-sectional shape of the second cross-sectional data is a predetermined value or more as an end of the main crimping range N1.

As described above, since the end in the main crimping range N1 is detected based on the amount of change in the cross-sectional shape of the second cross-sectional data obtained by cutting the surface of the socket 14 along the axial direction, the end in the main crimping range N1 can be efficiently and reliably detected.

<Step S34: Identification of Measurement Position (Longitudinal Direction) of Outer Diameter of Socket 14>

When the main crimping range N1 can be identified, the longitudinal position of the socket 14 can be identified among the measurement positions of the outer diameter of the socket 14. The procedure will be described below.

1. Preset parameters (for measurement) for determining the outer diameter measurement positions are obtained. A parameter for the first outer diameter D1 on the base side and a parameter for the second outer diameter D2 on the hose side are set as the parameters for determining the outer diameter measurement positions. Each parameter is set to, for example, approximately 5 mm to 2 mm.

2. A position where the parameter for the first outer diameter D1 is added to the base-side main crimping end Nα is set as a longitudinal measurement position of the first outer diameter D1. Additionally, a position where the parameter for the second outer diameter D2 is subtracted from the hose-side main crimping end NO is set as a longitudinal measurement position of the second outer diameter D2.

3. An intermediate point between the longitudinal measurement position of the first outer diameter D1 and the longitudinal measurement position of the second outer diameter D2 is set as a longitudinal measurement position of the third outer diameter D3.

That is, the measurement data calculating unit 46B calculates the outer diameter of the socket 14 at a point separated from the end in the main crimping range N1 by a predetermined reference distance as the measurement data.

As described above, the point separated from the end in the main crimping range N1 by the predetermined reference distance is set as the measurement position of the outer diameter of the socket, which is advantageously in easily detecting the measurement position of the outer diameter of the socket.

<Step S36: Detection of Position of Convex Portion 1410>

Next, the positions of the convex portions 1410 formed along the longitudinal direction at intervals in the circumferential direction of the socket 14 are detected. The procedure will be described below. Note that various filter setting values used in processing described below are previously set as parameters.

1. Sliced cross-sectional data (third cross-sectional data) at a point separated from the base-side main crimping end Nα by a predetermined distance is obtained. To improve the reproducibility of the position detection, it is preferable that the predetermined distance is parameterized as a preset value. An example of the sliced cross-sectional data is illustrated in FIG. 13B. In FIG. 13B, the vertical axis represents the height with respect to the center axis, and the horizontal axis represents the position along the circumferential direction of the socket 14, which is angular information. Note that the angular information is illustrated as a count value of a pulse signal output from the encoder 68.

Figure 21A:
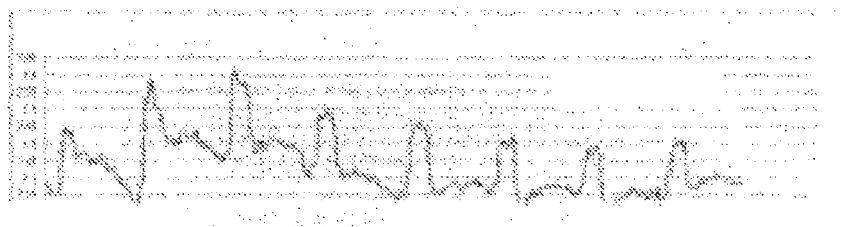
FIG. 21 are explanatory diagrams illustrating a procedure for detecting positions of convex portions.

2. The cross-sectional data is subjected to median filtering. FIG. 21A illustrates data subjected to the median filtering.

Figure 21B:
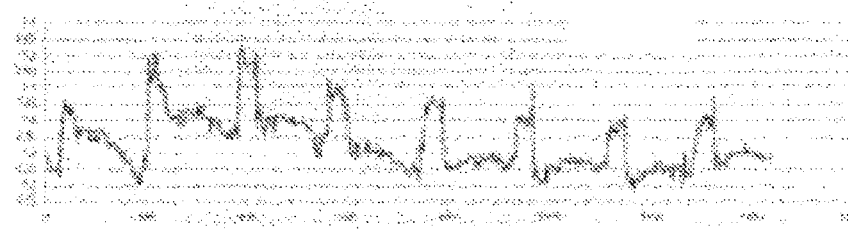

3. Sharpening filtering is applied to the data subjected to the median filtering. FIG. 21B illustrates data subjected to the median filtering.

Figure 21C:
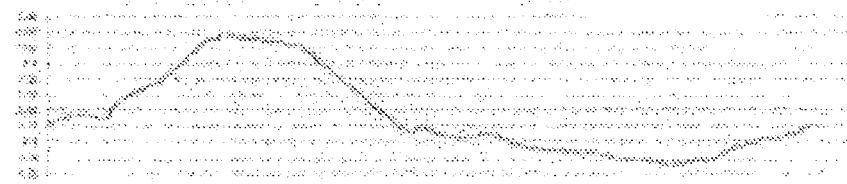

4. Moving average filtering is applied to data subjected to the sharpening filtering. FIG. 21C illustrates data subjected to the moving average filtering.

Figure 21D:
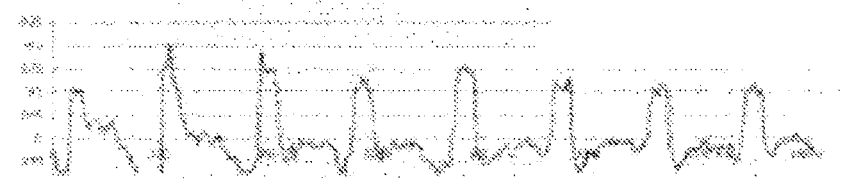

5. Noise is removed by taking a difference between the data subjected to sharpening filtering and the data subjected to the moving average filtering. The data with noise removed is illustrated in FIG. 21D.

6. The data with noise removed is normalized from 1 to 100.

Figure 21E:
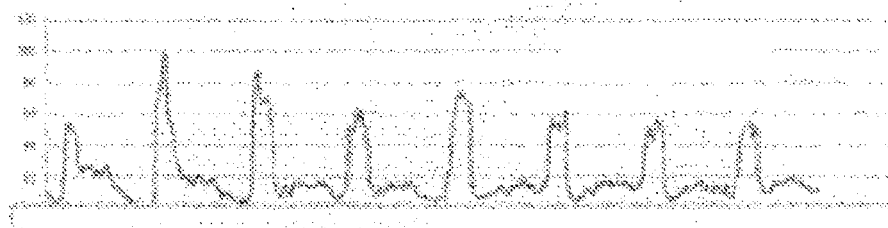
Figure 21F:
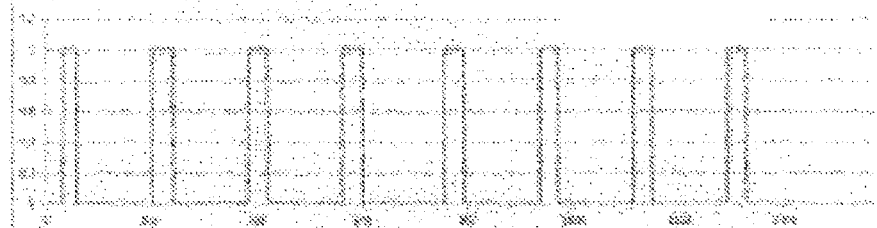

7. A lookup table (LUT) is created according to a gain correction coefficient γ of the measurement condition, and highlighting is performed by γ correction. The γ-corrected data is illustrated in FIG. 21E.

8. With respect to the γ-corrected data, the convex and concave portions are binarized using a determination threshold to detect edges. The binarized data is illustrated in FIG. 21E.

Because local noise occurs in the vicinity of the edges, fine edges are cancelled.

As described above, the rising position and the falling position of each of the convex portions 1410 are detected as angular information. Note that, when a distinct edge cannot be detected, processing is terminated as a measurement error.

<Step S38: Identification of Measurement Position (Circumferential Direction) of Outer Diameter of Socket 14>

For the outer diameter of the socket 14, four dimensions for each of the first outer diameter D1, the second outer diameter D2, and the third outer diameter D3 are measured every 45 degrees in the circumferential direction of the socket 14 (12 in total). At this time, the positions of the concave portions 1412 need to be measured while avoiding the convex portions 1410. Thus, the measurement positions of the outer diameter of the socket 14 in the circumferential direction are identified as follows.

Figure 22:
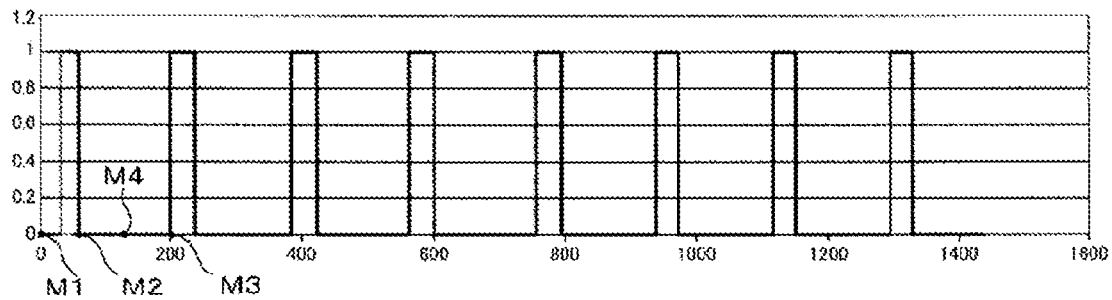
FIG. 22 is a diagram illustrating an example of filtered cross-sectional data.

1. Angular information on the falling edge and the rising edge are detected. Using FIG. 22 as an example, a rising edge M1, a falling edge M2, and a rising edge of M3 can be detected from a small angle side. A portion between the rising edge M1 and the falling edge M2 corresponds to the convex portion 1410, and a portion between the falling edge M2 and a rising edge M3 corresponds to the concave portion 1412.

2. An angle at an intermediate point M4 between the falling edge M2 and the rising edge M3, which corresponds to the concave portion 1412, is defined as a reference angle, and this position is defined as a first profile measurement position.

3. An angle of 45 degrees is sequentially added from the first profile measurement position to acquire a second profile measurement position, a third profile measurement position, and a fourth profile measurement position.

That is, the measurement data calculating unit 46B extracts third cross-sectional data obtained by cutting the surface in the main crimping range N1 in a direction perpendicular to the axis of the hose connector fitting 10, and detect the edges at areas corresponding to the convex portions 1410 by filtering the third cross-sectional data, and calculates the outer diameter of the socket 14 at the intermediate point between adjacent convex portions 1410.

In this manner, the measurement positions of the outer diameter of the socket 14 are identified, and the outer diameter of the socket 14 is measured at 24 positions in total. Note that the method for measuring the outer diameter is a well-known technique and thus, detailed description thereof is omitted.

Since the outer diameter of the socket 14 is calculated at the intermediate point between the adjacent convex portions in this manner, the outer diameter of the socket in the portion (concave portion) where the crimping tab abuts in the main crimping range N1 can be calculated, which is advantageous in evaluating the crimping state of the socket 14 more appropriately.

The method for calculating the circularity and the cylindricity is as described using FIG. 9 and FIG. 10.

That is, the measurement data calculating unit 46B calculates the outer diameter of the socket 14 at a first outer diameter measuring point (measuring point of the first outer diameter D1) separated from one end (the base-side main crimping end Nα) in the main crimping range N1 by a first reference distance and a second outer diameter measuring point (measuring point of the second outer diameter D2) separated from the other end (the hose-side main crimping end Nβ) in the main crimping range N1 by a second reference distance, and calculates the cylindricity that is a difference between the outer diameter at the first outer diameter measuring point and the outer diameter at the second outer diameter measuring point as measurement data.

The cylindricity is calculated using the socket outer diameter measured at the two positions in the main crimping range N1 in this manner, which is advantageous in accurately measuring the cylindricity that is an indicator for estimating the crimping state of the socket 14.

Additionally, the measurement data calculating unit 46B calculates the outer diameter of the socket 14 at a third outer diameter measuring point (measuring point of the third outer diameter D3) that is the intermediate point between the first outer diameter measuring point (measuring point of the first outer diameter D1) and the second outer diameter measuring point (measuring point of the second outer diameter D2) at a plurality of positions spaced at intervals in the circumferential position of the socket 14, and calculates the circularity that is a difference between a maximum value and a minimum value of the calculated values of the outer diameter at the third outer diameter measuring point as the measurement data.

The circularity is calculated as the difference between the maximum value and the minimum value among the calculated values of the outer diameter at the same position in this manner, which is advantageous in accurately measuring the circularity that is an indicator for evaluating the crimping state of the socket 14.

<Step S46: Detection of Crimping Position>

As illustrated in FIG. 9, the crimping position P is the distance between the end 1402 of the socket 14 on the side of the socket crimping concave portion 18 and the portion closer to the base portion 16 (the base-side main crimping end Nα) in the crimping range Nβ. In the present embodiment, eight crimping positions P are measured every 45 degree in the circumferential direction of the socket 14. The procedure will be described below.

1. Cross-sectional data (second cross-sectional data) obtained by cutting the surface of the socket 14 along the longitudinal direction (axial direction of the hose connector fitting 10) is extracted. In the present embodiment, eight pieces of cross-sectional data are extracted around the axis every 45 degrees.

2. For noise reduction, median filtering is executed.

3. For each cross-sectional data, a reference position Nγ for calculating the crimping position is detected from the filtered data.

Figure 24:
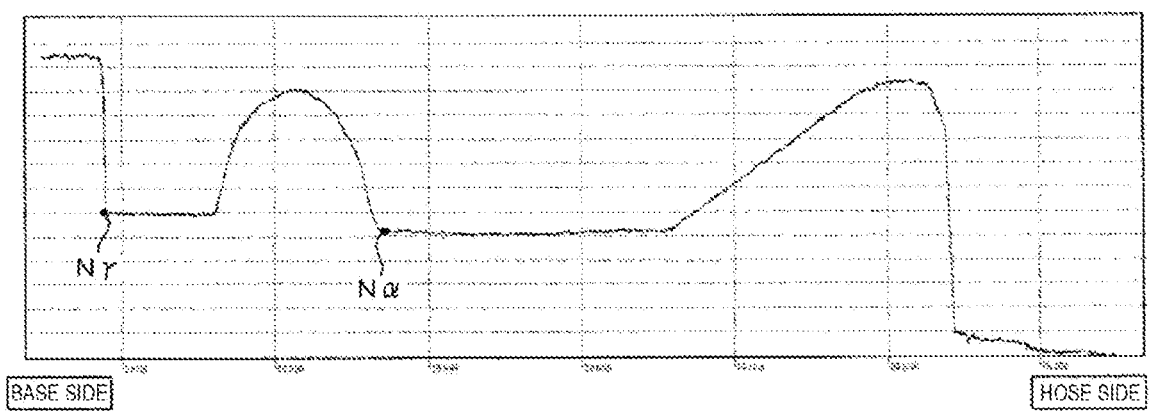
FIG. 24 is a diagram illustrating an example of cross-sectional data along the axial direction.

FIG. 24 illustrates an example of second cross-sectional data.

In FIG. 24, the left side of the sheet is the side of the base portion 16, and the right side of the sheet is the side of the hose 30, a vertical axis represents a height with respect to the center axis, and a horizontal axis represents the position along the longitudinal direction of the socket 14 (position coordinates increasing from the base side toward the hose side).

In the present embodiment, while searching positions of the socket from the base portion 16 toward the hose 30, a point at which a difference between the point and a laterally adjacent point in value (height) is a reference value or more is defined as a reference position Nγ.

4. The position of the base-side main crimping end Nα identified when detecting the main crimping range N1 is obtained again to detect the position of a correct edge (the base-side main crimping end Nα) at the measurement angle. At this time as well, a point at which a difference between the point and a laterally adjacent point in value (height) is a reference value or more is defined as the base-side main crimping end Nα.

5. For each cross-sectional data, the reference position Nγ is subtracted from the base-side main crimping end portion Nα to calculate the crimping position P.

6. The minimum value, the maximum value, and the average value of the crimping position P in each cross-sectional data are calculated.

<Step S48: Calculation of Crimping Tab Residual Width>

The crimping tab residual width W is the distance along the circumferential direction of the 1410 convex portions 1410, and are measured at eight positions because the eight convex portions 1410 are formed in the present embodiment. Additionally, the measurement position of the crimping tab residual width W in the longitudinal direction of the socket is the measurement position of the third outer diameter D3, which is the center point in the main crimping range N1. The procedure will be described below.

1. Four values of the third outer diameters D3 calculated in step S40 are obtained.

2.4 An average value of the four third outer diameters D3 is calculated.

3. The outer circumferential value is calculated from the average value of the third outer diameter D3 (average outer circumferential value×π).

4. The outer circumferential value is divided by the entire circumferential angle to calculate the outer circumferential value per unit angle.

5. The rising position and falling position of the convex portion 1410 calculated in step S36 are obtained as angular information.

6. The amount of the angle from the rising position to the falling position of the convex portion 1410 is multiplied by the outer circumferential value per unit angle to calculate the crimping tab residual width W.

In fact, the angular information is illustrated as a count value of the pulse signal output from the encoder 68, the outer circumferential value per unit angle is an outer circumferential value per pulse, and the angle from the rise position to the falling position is the number of pulses from the rise position to the falling position.

The distance along the circumferential direction of the convex portions 1410 is calculated as the crimping tab residual width in this manner, which is advantageous in accurately measuring the crimping tab residual width.

As described above, according to the present embodiment, since the three-dimensional shape of the surface of the socket 14 is detected by the line sensor in a non-contact manner to calculate measurement data on the crimping state of the socket 14, as compared to the case where measurement data is manually obtained using a caliper as heretofore, the measurement data has less variation, which is advantageous in improving the reproducibility of the measurement data.

In particular, according to the present embodiment, since the linear distance data on the distance to the surface of the socket 14 along the direction parallel to the axis O1 of the hose connector fitting 10 is detected over the entire circumference of the socket 14, the shape of the socket 14 can be detected with high accuracy to obtain various measurement data on the crimping state of the socket 14 more accurately.

In addition, according to the present embodiment, since the error between the extending direction of the axis O1 of the hose connector fitting 10 and the distance data detection line direction is corrected in a state where the hose connector fitting 10 is supported by the fitting support portion 36, any error in the distance data due to core displacement can be reduced, which is advantageous in improving the accuracy of the measurement data.

Additionally, according to the present embodiment, the acceptability is determined based on accurate measurement data with less variation, which is advantageous in determining the acceptability of the hose connector fitting reliably and efficiently.

The invention claimed is:

1. A shape measuring device for a hose connector fitting in which an outer circumferential surface of a socket is crimped toward a radially inner side within a crimping range along an axial direction of the socket in a state where a hose is inserted into an annular space between an outer circumferential portion of a nipple and an inner circumferential portion of the socket, the shape measuring device comprising:

a distance data detecting unit configured to detect distance data on a distance to a surface of the socket in a range including at least an entirety of the crimping range;

a shape data generating unit configured to generate shape data representing three-dimensional shape of the surface of the socket based on the distance data; and a measurement data calculating unit configured to calculate measurement data on a crimping state of the socket based on the shape data, wherein the crimping range of the socket includes a main crimping range having a smaller diameter than other ranges of the socket, and the measurement data calculating unit is configured to extract second cross-sectional data obtained by cutting the surface of the socket along an axial direction of the hose connector fitting, and detect a point at which an amount of change in cross-sectional shape in the second cross-sectional data is a predetermined value or more, as an end in the main crimping range.

2. The shape measuring device for the hose connector fitting according to claim 1, wherein the distance data detecting unit detects linear distance data along an extending direction of an axis of the hose connector fitting over an entire circumference of the socket.

3. The shape measuring device for the hose connector fitting according to claim 2, wherein while the distance data detecting unit detects the distance data, the hose connector fitting is supported such that an extending direction of an axis of the hose connector fitting substantially coincides with a detection line of the distance data, and the measurement data calculating unit is configured to extract first cross-sectional data obtained by cutting the surface of the socket in a direction perpendicular to the axis of the hose connector fitting at predetermined intervals, and coincide center points of a plurality of pieces of the first cross-sectional data to a virtual axial direction to correct an error between the extending direction of the axis of the hose connector fitting and a direction of the distance data detection line in a state where the hose connector fitting is supported by a support portion.

4. The shape measuring device for the hose connector fitting according to claim 1, wherein the measurement data calculating unit calculates an outer diameter of the socket at a point separated from the end in the main crimping range by a predetermined reference distance as the measurement data.

5. The shape measuring device for the hose connector fitting according to claim 4, wherein a concave portion formed along a longitudinal direction of the socket due to abutment of a crimping tab at crimping and a convex portion sandwiched between the concave portions are alternately formed in a circumferential direction of the socket in the main crimping range, and the measurement data calculating unit is configured to extract third cross-sectional data obtained by cutting the surface in the main crimping range in a direction perpendicular to the axis of the hose connector fitting, detect an edge at a position corresponding to the convex portion by filtering the third cross-sectional data, and calculate the outer diameter of the socket at an intermediate point between adjacent convex portions.

6. The shape measuring device for the hose connector fitting according to claim 5, wherein
the measurement data calculating unit calculates a crimping tab residual width that is a distance along a circumferential direction of the convex portion, as the measurement data.

7. The shape measuring device for the hose connector fitting according to claim 1, wherein
the measurement data calculating unit is configured to calculate an outer diameter of the socket at a first outer diameter measuring point separated from one end in the main crimping range by a first reference distance and a second outer diameter measuring point separated from an other end in the main crimping range by a second reference distance, and calculate a cylindricity that is a difference between the outer diameter at the first outer diameter measuring point and the outer diameter at the second outer diameter measuring point as the measurement data.

8. The shape measuring device for the hose connector fitting according to claim 7, wherein
the measurement data calculating unit is configured to calculate the outer diameter of the socket at a third outer diameter measuring point that is an intermediate point between the first outer diameter measuring point and the second outer diameter measuring point at a plurality of positions spaced at intervals in a circumferential position of the socket, and calculate circularity that is a difference between a maximum value and a minimum value of calculated values of the outer diameter at the third outer diameter measuring point as the measurement data.

9. The shape measuring device for the hose connector fitting according to claim 1, further comprising a determining unit configured to determine acceptability of the crimping state of the socket based on the measurement data.

10. A shape measuring method for a hose connector fitting in which an outer circumferential surface of a socket is crimped toward a radially inner side within a crimping range along an axial direction of the socket in a state where a hose is inserted into an annular space between an outer circumferential portion of a nipple and an inner circumferential portion of the socket, the shape measuring method comprising:
a distance data detecting step of detecting distance data on a distance to a surface of the socket in a range including at least an entirety of the crimping range;
a shape data generating step of generating shape data representing three-dimensional shape of the surface of the socket based on the distance data; and a measurement data calculating step of calculating measurement data on a crimping state of the socket based on the shape data; wherein
the crimping range of the socket includes a main crimping range having a smaller diameter than other ranges of the socket, and
the measurement data calculating step includes extracting second cross-sectional data obtained by cutting the surface of the socket along the axial direction of the hose connector fitting, and detecting a point at which an amount of change in cross-sectional shape in the second cross-sectional data is a predetermined value or more, as an end in the main crimping range.

11. The shape measuring method for the hose connector fitting according to claim 10, wherein
the distance data detecting step includes detecting linear distance data along an extending direction of an axis of the hose connector fitting over an entire circumference of the socket.

12. The shape measuring method for the hose connector fitting according to claim 11, wherein
while the data detecting unit detects the distance data, the hose connector fitting is supported such that an extending direction of an axis of the hose connector fitting substantially coincides with a detection line of the distance data, and
the measurement data calculating step includes extracting first cross-sectional data obtained by cutting the surface of the socket in a direction perpendicular to the axis of the hose connector fitting at predetermined intervals, and coinciding center points of a plurality of pieces of the first cross-sectional data with a virtual axial direction to correct an error between the extending direction of the axis of the hose connector fitting and a direction of the distance data detection line in a state where the hose connector fitting is supported by a support portion.

13. The shape measuring method for the hose connector fitting according to claim 10, wherein
the measurement data calculating step includes calculating an outer diameter of the socket at a point separated from an end in the main crimping range by a predetermined reference distance as the measurement data.

14. The shape measuring method for the hose connector fitting according to claim 13, wherein
a concave portion formed along a longitudinal direction of the socket due to abutment of a crimping tab at crimping and a convex portion sandwiched between the concave portions are alternately formed in a circumferential direction of the socket in the main crimping range, and
the measurement data calculating step includes extracting third cross-sectional data obtained by cutting the surface in the main crimping range in a direction perpendicular to the axis of the hose connector fitting, detecting an edge at a position corresponding to the convex portion by filtering the third cross-sectional data, and calculating the outer diameter of the socket at an intermediate point between adjacent convex portions.

15. The shape measuring method for the hose connector fitting according to claim 14, wherein
the measurement data calculating step includes calculating a crimping tab residual width that is a distance along a circumferential direction of the convex portion, as the measurement data.

16. The shape measuring method for the hose connector fitting according to claim 10, wherein
the measurement data calculating step includes calculating an outer diameter of the socket at a first outer diameter measuring point separated from one end in the main crimping range by a first reference distance and a second outer diameter measuring point separated from an other end in the main crimping range by a second reference distance, and calculating cylindricity that is a difference between the outer diameter at the first outer diameter measuring point and the outer diameter at the second outer diameter measuring point as the measurement data.

17. The shape measuring method for the hose connector fitting according to claim 16, wherein
the measurement data calculating step includes calculating the outer diameter of the socket at a third outer diameter measuring point that is an intermediate point between the first outer diameter measuring point and the second outer diameter measuring point at a plurality of positions spaced at intervals in a circumferential position of the socket, and calculate circularity that is a difference between a maximum value and a minimum value of calculated values of the outer diameter at the third outer diameter measuring point as the measurement data.

18. The shape measuring method for the hose connector fitting according to claim 10, further comprising a determining step of determining acceptability of the crimping state of the socket based on the measurement data.

19. A non-transitory computer readable medium storing a shape measuring program for a hose connector fitting, the shape measuring program being executable by a computer to perform the shape measuring method for the hose connector fitting described in claim 10.

\* \* \* \* \*